(12) United States Patent
Harris et al.

(10) Patent No.: US 12,509,028 B1
(45) Date of Patent: Dec. 30, 2025

(54) SYSTEMS AND METHODS FOR AUTOMATED CONTROL OF ACTUATION COMPONENTS IN CAR WASH FACILITIES

(71) Applicant: MW POS, Inc., Arlington, VA (US)

(72) Inventors: Nathan Alan Harris, Washington, DC (US); Joshua Richard Dotson, Cuyahoga Falls, OH (US); James Hodges McAliley, Charleston, SC (US); Aaron Mykal Clint, Stewartsville, MT (US); Jonathan David Hester, Charlotte, NC (US)

(73) Assignee: MW POS, Inc., Arlington, VA (US)

( * ) Notice: Subject to any disclaimer, the term of this patent is extended or adjusted under 35 U.S.C. 154(b) by 0 days.

(21) Appl. No.: 19/189,021

(22) Filed: Apr. 24, 2025

Related U.S. Application Data

(63) Continuation of application No. 19/081,824, filed on Mar. 17, 2025.
(Continued)

(51) Int. Cl.
*B60S 3/00* (2006.01)
*B60S 3/04* (2006.01)
(Continued)

(52) U.S. Cl.
CPC . *B60S 3/04* (2013.01); *B60S 3/00* (2013.01); *G05B 15/02* (2013.01); *G06V 20/625* (2022.01); *G06V 2201/08* (2022.01)

(58) Field of Classification Search
CPC .. B60S 3/04; B60S 3/00; G05B 15/02; G06V 20/625; G06V 2201/08
See application file for complete search history.

(56) References Cited

U.S. PATENT DOCUMENTS

| 9,405,988 B2 | 8/2016 | Alves |
| 2001/0020198 A1 | 9/2001 | Wilson |

(Continued)

FOREIGN PATENT DOCUMENTS

| CN | 105205499 A | * 12/2015 | ........... G06F 16/248 |
| JP | 2020-135898 A | 8/2020 | |

OTHER PUBLICATIONS

Non-Final Office Action on U.S. Appl. No. 19/188,968 dated May 30, 2025.

(Continued)

*Primary Examiner* — Michael W Choi
(74) *Attorney, Agent, or Firm* — Foley & Lardner LLP

(57) ABSTRACT

A system can include one or more processors, coupled with memory. The one or more processors can receive first images of a vehicle and a license plate of the vehicle and identify, from the first images, license plate information of the vehicle and one more vehicle features of the vehicle and identify a type of car wash service to be performed on the vehicle. The one or more processors can generate a car wash service request and receive one or more second images of the license plate of the vehicle. The one or more processors can identify an identity of the vehicle entering into the car wash system, generate a car wash routine using the car wash service request, and transmit instructions to cause the car wash system to execute the car wash routine by selectively controlling deployment of car wash actuation components based on the vehicle features.

20 Claims, 7 Drawing Sheets

Related U.S. Application Data

(60) Provisional application No. 63/738,281, filed on Dec. 23, 2024, provisional application No. 63/699,778, filed on Sep. 26, 2024.

(51) Int. Cl.
  *G05B 15/02* (2006.01)
  *G06V 20/62* (2022.01)

(56) References Cited

U.S. PATENT DOCUMENTS

| | | | |
|---|---|---|---|
| 2002/0140577 | A1 | 10/2002 | Kavner |
| 2006/0180647 | A1 | 8/2006 | Hansen |
| 2008/0222004 | A1 | 9/2008 | Pollock et al. |
| 2009/0057401 | A1 | 3/2009 | Brott et al. |
| 2011/0288909 | A1 | 11/2011 | Hedley et al. |
| 2013/0204798 | A1* | 8/2013 | Gabrysch ............... G06Q 10/06 705/308 |
| 2015/0049914 | A1 | 2/2015 | Alves |
| 2017/0140237 | A1 | 5/2017 | Voeller et al. |
| 2018/0268238 | A1* | 9/2018 | Khan ................... G06V 10/751 |
| 2019/0043201 | A1 | 2/2019 | Strong et al. |
| 2020/0294052 | A1 | 9/2020 | Cacciami |
| 2021/0150499 | A1* | 5/2021 | Fazio ...................... G07F 17/20 |
| 2022/0092996 | A1* | 3/2022 | Korngold ................ G06T 7/73 |
| 2023/0004899 | A1 | 1/2023 | Van Breen |
| 2023/0249653 | A1* | 8/2023 | Stoel ................... G07F 17/0035 705/1.1 |
| 2024/0185566 | A1* | 6/2024 | Thomas ............... G06V 20/625 |
| 2024/0311937 | A1 | 9/2024 | Siefken et al. |
| 2024/0331393 | A1 | 10/2024 | Petrey et al. |
| 2024/0378570 | A1* | 11/2024 | Steele, III ............. G06Q 10/20 |
| 2024/0378925 | A1 | 11/2024 | Nichols et al. |

OTHER PUBLICATIONS

Non-Final Office Action on U.S. Appl. No. 19/189,015 dated Aug. 8, 2025.

Notice of Allowance on U.S. Appl. No. 19/188,968 dated Jul. 30, 2025.

Notice of Allowance on U.S. Appl. No. 19/189,015 Dtd Oct. 15, 2025.

\* cited by examiner

610

SYSTEMS AND METHODS FOR AUTOMATED CONTROL OF ACTUATION COMPONENTS IN CAR WASH FACILITIES

CROSS-REFERENCES TO RELATED APPLICATIONS

This application is a continuation and claims the benefit of priority under 35 U.S.C. § 120 to U.S. Non-Provisional patent application Ser. No. 19/081,824, filed Mar. 17, 2025, which claims the benefit of priority under 35 U.S.C. § 119 to U.S. Provisional Patent Application No. 63/699,778, filed Sep. 26, 2024, and to U.S. Provisional Patent Application No. 63/738,281, filed Dec. 23, 2024, all of which are hereby incorporated by reference herein in their entirety and for all purposes.

BACKGROUND

Vehicle service facilities, including car wash establishments, have evolved to meet the growing demand for efficient and convenient vehicle care. These facilities can include various devices, systems and machinery to automate different aspects of the services provided, including car wash systems for providing various services to vehicles.

SUMMARY

Technical solutions described herein are directed to systems and methods for automating vehicle service facility operations using advanced image recognition and customized service delivery. Automated vehicle service facilities, such as car wash facilities, can experience technical challenges while adjusting control of system actuation components to different vehicle configurations. Inaccurate or incorrect deployment of actuation components during automated car wash services may result in damage to the vehicle or compromised safety to the personnel. For instance, when providing car wash services to differently shaped vehicles, such as a sedan, a truck or vehicles with customized components, employing actuation components in the same way may inadvertently damage some of the vehicle components. For a vehicle with a protruding component installed on a roof of the vehicle, overhead actuation components configured to clean a roof of the vehicle may collide with the roof or the component. This can both impact the user experience and introduce various operational challenges, including difficulties in automating service, hinder the facility safety, lead to vehicle damage, and trigger a waste in system resources and energy to perform the services.

To overcome such challenges, the technical solutions of this disclosure utilize at least one image capture and recognition system to provide reliable license plate and vehicle feature identification, automating selective deployment of actuation components for car wash services. The technical solutions can provide rapid license plate reading and identify a type of car wash to provide to the vehicle based on the license plate information. The technical solutions can identify the vehicle entering a car wash system, and selectively deploy components of the car wash system based on identified features of the vehicle and the type of car wash. The identification of a type of service and features of the vehicle allow for accurate and automated provision of services to vehicles while mitigating any damage to features of the vehicle by the components of the car wash system. In doing so, the technical solutions allow for improved automation and a reduction in operational error, resulting in resource and energy saving and an overall improved customer satisfaction.

At least one aspect of the technical solutions is directed to a system. The system can include one or mor processors coupled with memory to receive, via a first image capture device, one or more first images of a vehicle and a license plate of the vehicle while the vehicle is at a first region of a service facility including a car wash system. The one or more processors can identify, from the one or more first images, license plate information of the vehicle and one more vehicle features of the vehicle. The one or more processors can identify a type of car wash service to be performed on the vehicle. The one or more processors can generate a car wash service request including the license plate information of the vehicle, the one or more vehicle features of the vehicle, and the type of car wash service to be performed on the vehicle. The one or more processors can receive, via a second image capture device, one or more second images of the license plate of the vehicle while the vehicle is at a second region of the service facility. The one or more processors can identify, from the one or more second images, an identity of the vehicle entering into the car wash system. The one or more processors can generate a car wash routine using the car wash service request and transmit, to a car wash controller, one or more instructions to cause the car wash system to execute the car wash routine by selectively controlling deployment of one or more car wash actuation components based on the vehicle features.

In some implementations, the one or more processors can determine that the one or more vehicle features are installed on a roof of the vehicle. The one or more processors can identify, responsive to the determination, an actuation component of the one or more car wash actuation components configured to clean the roof of the vehicle and selectively control deployment of the actuation component based on the one or more vehicle features on the roof of the vehicle. The one or more processors can identify a data structure of a vehicle profile comprising an entry for vehicle features and store, into the data structure of the vehicle profile, information on the one or more vehicle features. The one or more second images can be captured at the second region of the service facility at a second time interval subsequent to a first time interval during which the one or more first images were captured at the first region of the service facility. The one or more second images can include the license plate of the vehicle and the one or more processors can be configured to determine the identity of the vehicle based on extracted license plate information from the one or more second images. The one or more vehicle features can include at least one of: a physical object attached to the vehicle or a characteristic of the vehicle, wherein the characteristic of the vehicle comprises at least one of: a color of vehicle, a shape of the vehicle, a size of the vehicle, or a vehicle dimension.

In some implementations, the one or more car wash actuation components can include a component to control application of one or more fluids onto the vehicle during the car wash routine. The one or more car wash actuation components can include a component to control application of physical contact of a material onto a surface of the vehicle during the car wash routine. The car wash routine can include deploying a first actuation component of the one or more car wash actuation components during a first portion of the car wash routine and restricting deployment of a second actuation component of the one or more car wash actuation components during a second portion of the car wash routine. The car wash controller can be communicatively coupled with the first image capture device, the second image capture device, a database storing the type of car wash service and the car wash system. The one or more processors can identify the one or more vehicle features corresponding to a paint of the vehicle and selectively control deployment of a car wash actuation component for providing a car wash soap solution based on the paint. The one or more processors can identify at least one of a make or a model of the vehicle and provide, to the car wash controller, an instruction to selectively control deployment of a car wash actuation component of the one or more car wash actuation components, based on at least one of the make or the model.

In some implementations, the one or more processors can identify, based on the one or more first images or the one or more second images, a difference between a body of the vehicle and a representation of the body of the vehicle stored in a vehicle profile of the vehicle. The one or more processors can determine that the difference satisfies a threshold for a significant difference and generate a notification to display on a device to indicate that the body of the vehicle differs from the stored representation of the body of the vehicle profile. The notification can include an alert to indicate that the vehicle had sustained damage since a prior update to the vehicle profile. The one or more processors can update the representation of the body of the vehicle in the vehicle profile responsive to the difference satisfying the threshold.

Another aspect of the technical solution is directed towards a method. The method can include receiving, by one or more processors, via a first image capture device, one or more first images of a vehicle and a license plate of the vehicle while the vehicle is at a first region of a service facility including a car wash system. The method can include identifying, by the one or more processors, from the one or more first images, license plate information of the vehicle and one more vehicle features of the vehicle. The method can include identifying, by the one or more processors, a type of car wash service to be performed on the vehicle. The method can include generating, by the one or more processors, a car wash service request including the license plate information of the vehicle, the one or more vehicle features of the vehicle, and the type of car wash service to be performed on the vehicle. The method can include receiving, by the one or more processors, via a second image capture device, one or more second images of the license plate of the vehicle while the vehicle is at a second region of the service facility. The method can include identifying, by the one or more processors, from the one or more second images, an identity of the vehicle entering into the car wash system. The method can include generating, by the one or more processors, a car wash routine using the car wash service request and transmitting, by the one or more processors, to a car wash controller, one or more instructions to cause the car wash system to execute the car wash routine by selectively controlling deployment of one or more car wash actuation components based on the vehicle features.

In some implementations, the method can include determining, by the one or more processors, that the one or more vehicle features are installed on a roof of the vehicle. The method can include identifying, by the one or more processors, responsive to the determination, an actuation component of the one or more car wash actuation components configured to clean the roof of the vehicle and selectively controlling deployment, by the one or more processors of the actuation component based on the one or more vehicle features on the roof of the vehicle. The one or more vehicle features can include at least one of: a physical object attached to the vehicle or a characteristic of the vehicle, wherein the characteristic of the vehicle comprises at least one of: a color of vehicle, a shape of the vehicle, a size of the vehicle, or a vehicle dimension.

Another aspect of the present disclosure is directed towards a non-transitory computer-readable medium including instructions that when executed by one or more processors, can cause the one or more processors to receive, via a first image capture device, one or more first images of a vehicle and a license plate of the vehicle while the vehicle is at a first region of a service facility including a car wash system. The one or more processors can identify, from the one or more first images, license plate information of the vehicle and one more vehicle features of the vehicle. The one or more processors can identify a type of car wash service to be performed on the vehicle. The one or more processors can generate a car wash service request including the license plate information of the vehicle, the one or more vehicle features of the vehicle, and the type of car wash service to be performed on the vehicle. The one or more processors can receive, via a second image capture device, one or more second images of the license plate of the vehicle while the vehicle is at a second region of the service facility. The one or more processors can identify, from the one or more second images, an identity of the vehicle entering into the car wash system. The one or more processors can generate a car wash routine using the car wash service request and transmit, to a car wash controller, one or more instructions to cause the car wash system to execute the car wash routine by selectively controlling deployment of one or more car wash actuation components based on the vehicle features.

In some implementations, the non-transitory computer-readable medium including instructions that cause the one or more processors to identify, based on the one or more first images or the one or more second images, a difference between a body of the vehicle and a representation of the body of the vehicle stored in a vehicle profile of the vehicle. The one or more processors can determine that the difference satisfies a threshold for a significant difference and generate a notification to display on a device to indicate that the body of the vehicle differs from the stored representation of the body of the vehicle profile.

DETAILED DESCRIPTION

Figure 1:
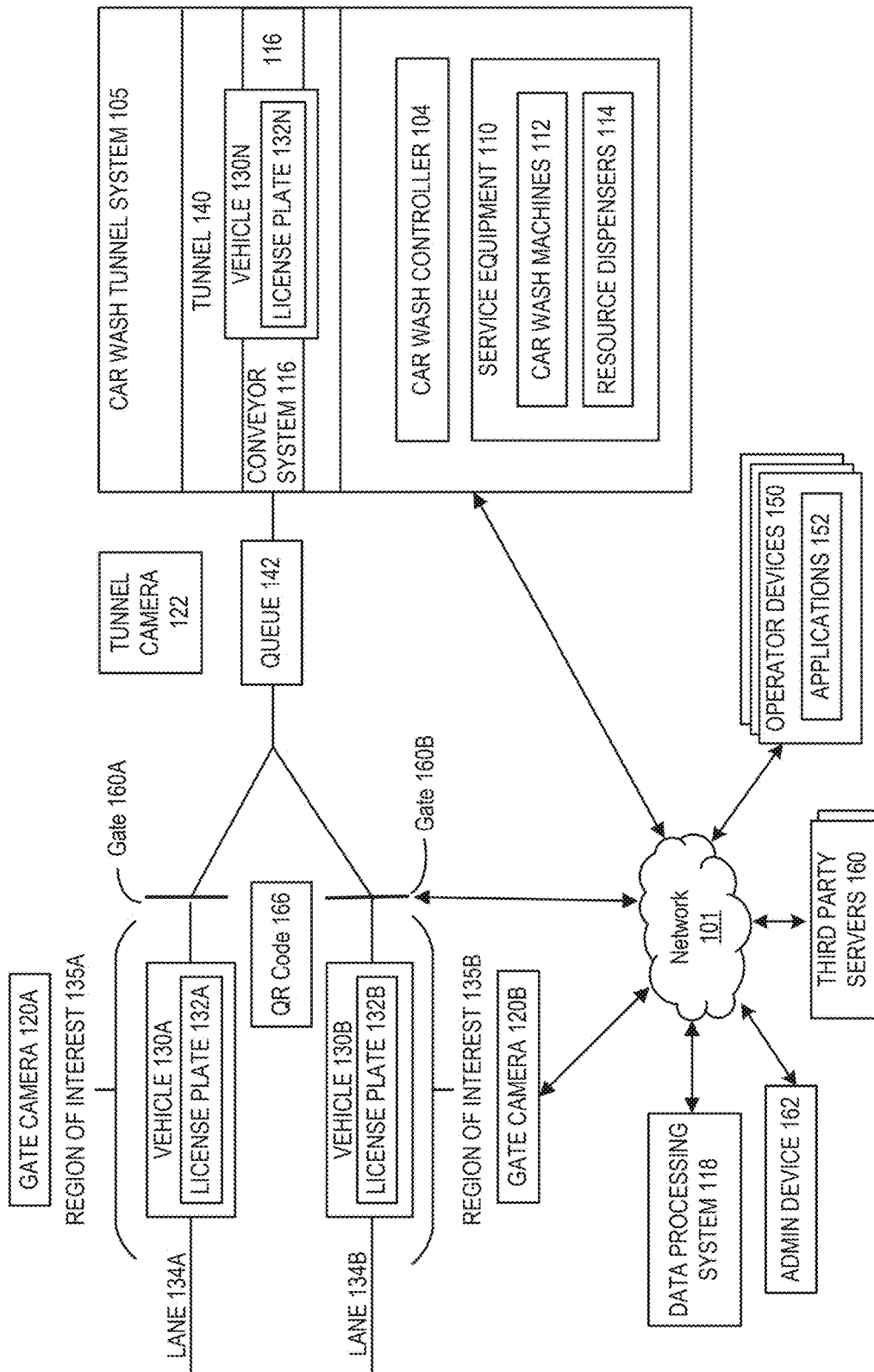
FIG. 1 is an example block diagram of a system for automated operation platform for a vehicle service facility.

For purposes of reading the description of the various implementations below, the following descriptions of the sections of the specification and their respective contents may be helpful:

Section A describes an overview of a service facility and its computing environment.

Section B describes systems and methods for automated control of actuation components and resources in car wash facilities.

Vehicle service facilities, particularly automated car wash facilities, can face technical challenges in maintaining energy and time-efficient and error-free operations. These challenges can include accurately identifying features of vehicles with preset car wash service types, leading to misidentification of the vehicles, incorrect provision of services to the vehicles, and potential damage done to the vehicles by automated car wash equipment. For example, a system to provide car wash services may provide a preset services to vehicles, making it a challenge to automate customized car wash operation of the car wash to accommodate different vehicles. In such instances, service interruptions may rely on manual identification of each vehicle and adjustment to car wash services based on the vehicle configuration to select actuation components in order to avoid collisions or damage, introducing inefficient use of energy and resources and increased wait times. These technical hurdles can impede operation of automated vehicle service facilities, and reduced system resource and energy efficiency, resulting in increased errors and service interruptions and reduced customer satisfaction.

To address these challenges, the technical solutions of this disclosure provide an automated platform that improves the reliability and accuracy of operations of the facility for reduced errors and improved customer satisfaction. The solutions can utilize image capture and recognition technology, which can include character image recognition and machine learning, to accurately identify license plate numbers to identify vehicle data and features associated with the respective vehicle. The vehicle data can include a type of car wash service to provide to the vehicle. The features can include, for example, roof components of the vehicle such as a roof rack. This improved recognition capability and utilization of the recognition can reduce instances of vehicle misidentification, incorrect service provision, and vehicle damage due to actuation components, reducing errors and automating service provisions to the vehicle based on a preset type of car wash service, thereby improving efficiency and conserving resources. Furthermore, the technical solutions can automate service customization to identified vehicles facilitating allocation of exact resources to each individual vehicle, mitigating wasteful overuse of water, soap, and electricity. As a result, the technical solutions can operate the vehicle service facility at an improved energy-efficient, environmentally friendly, and cost-effective service, than was the case prior to use of these technical solutions.

A. Overview of a Service Facility Computing Environment

The system of the technical solutions can include a computing environment having any combination of hardware and software for providing automated vehicle recognition at service facilities.

FIG. 1 illustrates an example block diagram of a facility 100, which can be referred to as a facility system or an environment, for providing a service to vehicles 130 or vehicle drivers. The facility 100 can include any combination of an indoor or outdoor area of a facility, space or a structure (e.g., a building) that can be configured or used as a location for deploying service systems, such as a car wash tunnel system 105 configured to provide services, such as car wash services, to vehicles 130 or their drivers. The facility 100 can include one or more outdoor areas that can include pathways or lanes 134 for directing or controlling the vehicles 130 arriving for service to be performed by the service system, such as the car wash tunnel system 105, at which the vehicle services are provided. The facility 100 can be, or include any type of a service facility, such as a car wash facility, a vehicle technical or a maintenance service facility (e.g., a system-based or automated oil change establishment), a fast food restaurant with a drive through for servicing drivers in the vehicles, an automated parking garage, a gas station, an event venue (e.g., a sports stadium) having vehicle parking centers, or any other facility managing or providing services involving vehicles or their drivers (e.g., drivers).

The facility 100 can include one or more of car wash tunnel systems 105 that can have one or more tunnels 140 with service equipment 110 configured to provide vehicle services, such as car washing, to various vehicles 130 passing through the tunnel 140. Each tunnel 140 can include one or more conveyor systems 116 over or onto which the vehicles 130 can be transported, passed or moved. For instance, a vehicle 130N identified by a license plate 132N can coupled or latched with the conveyor system 116 and moved, pushed or passed through the tunnel 140 as the service equipment 110 of the car wash tunnel system 105 provides automated car wash service. The car wash tunnel system 105 can include one or more car wash controllers 104 for controlling the one or more service equipment 110, which can include, for example, various car wash machines 112 and resource dispensers 114 for performing the automated car wash operations.

The facility 100 can include one or more lanes 134 for directing vehicle traffic towards the car wash tunnel system 105. For example, a facility 100 can include an external or outdoor space having a first lane 134A on which a first vehicle 130A identified by a first license plate 132A can move towards a first gate 160A. The facility 100 can include a second lane 134B on which a second vehicle 130B identified by a second license plate 132B can move towards a second gate 160B. The first lane 134A can include or encompass a first region of interest 135A that can be viewed, recorded or monitored by a first gate camera 120A capturing images or videos of the vehicle 130A as this vehicle approaches or passes the gate 160A controlling this vehicle's access to a queue 142 for entering tunnel 140 of the car wash tunnel system 105. Similarly, the lane 134B can include a second region of interest 135B that can be recorded or monitored by a second gate camera 120B capturing images or videos of the vehicle 130B as it approaches or passes the gate 160B controlling this vehicle's access to the queue 142.

The facility can include one or more quick response (QR) codes 166, which can be deployed at any location in the facility environment (e.g., along or adjacent to lanes 134, gates 160 or a structure housing a car wash tunnel system 105. A QR code 166 can include any two-dimensional barcode that can store or represent data such as URLs, text, or other types of information that can be read by a smartphone of a driver of the vehicle 130 or other QR code reader. When a user (e.g., a driver) takes a picture of the QR code 166 or otherwise captures the QR code with their mobile device, the QR code 166 can (e.g., include data) be used to cause the mobile device of the user to open an application or a webpage corresponding to the QR in which the user can select services to utilize, change their service type (e.g., monthly or annual subscription), and configure particular services (e.g., polishing of the vehicle, special type of washing service). The QR code 166 can be used to facilitate interaction between the user and the service provider, improving the user experience by providing an efficient way to access and manage services.

The gate cameras 120 and the gates 160 can be communicatively coupled with a data processing system 118, via one or more networks 101 of the facility system 100. The network 101 can communicatively couple and provide communication medium for one or more operator devices 150 executing applications 152, one or more third party servers 190 executing third party services (e.g., transaction operations) and one or more administrative devices 162 for providing administrative overview and services to the facility system 100. The network 101 can provide, enable, or otherwise facilitate the connections for communications between the data processing system 118 and gate cameras 120 to provide images or videos of the vehicles 130 and their license plates 132 to the data processing system to identify the service according to the entity profiles associated with the vehicles 130.

Facility 100 can include any combination of an indoor or outdoor area of a facility, space, or structure configured for deploying service systems, such as a car wash tunnel system 105. Facility 100 can be a car wash facility, a vehicle maintenance service facility, a fast food restaurant with a drive-through, an automated parking garage, a gas station, or an event venue with vehicle parking centers. Facility 100 can include pathways or lanes 134 for directing vehicles 130 arriving for service to be performed by the service system, such as car wash tunnel system 105. For instance, facility 100 can have outdoor areas with lanes 134 guiding vehicles 130 towards car wash tunnel system 105. Facility 100 can manage or provide services involving vehicles or their drivers, such as drivers. Facility 100 can include regions of interest 135 monitored by gate cameras 120 to capture images or videos of vehicles 130 as they approach or pass gates 160. Facility 100 can be communicatively coupled with data processing system 118, operator devices 150, third party servers 190, and admin devices 162 via network 101.

The facility 100 can include a building, a structure, or a service center at which vehicles 130 are cleaned, serviced, upgraded, or repaired or at which drivers of the vehicles receive services. The facility 100 can include, for example, exits and entrances, wash lanes, a wash tunnel, service bays, staffing, sensors, wash components, automated kiosks, among others to provide a service to a customer in the content of a washing, or any other, service. The facility 100 can include systems or processes, involving for example, service equipment 110 data processing systems 118, which can be overseen, managed, run, or otherwise controlled by operators, which can be authorized personnel, such as users of the operator devices 150 or admin device 162. The operators can include workers, technicians, managers, administrators, among other authorized personnel.

Car wash tunnel system 105 can include one or more tunnels 140 with service equipment 110 configured to provide vehicle services, such as car washing services. For example, car wash tunnel system 105 can have tunnels 140 with conveyor systems 116 over which vehicles 130 can be moved, guided or transported. Car wash tunnel system 105 can include car wash controllers 104 for controlling service equipment 110, which can include car wash machines 112 and resource dispensers 114. For instance, a vehicle 130 identified by a license plate 132 can be coupled with conveyor system 116 and moved through tunnel 140 as service equipment 110 provides automated car wash service. For instance, upon identifying a vehicle 130A, the car wash tunnel system 105 can be instructed to apply a particular set of car wash operations by the service equipment 110 in accordance with the settings or configurations for the account of the vehicle. Car wash tunnel system 105 can perform various automated car wash operations using car wash machines 112 and resource dispensers 114. Car wash tunnel system 105 can be deployed within a building or a structure at a facility 100, which can be accessed via lanes 134 and gates 160 controlling the flow of vehicles 130 to the tunnel 140. Car wash tunnel system 105 can be communicatively coupled with data processing system 118 to receive instructions for controlling service equipment 110.

Car wash controller 104 can include any combination of hardware and software for controlling service equipment 110 in car wash tunnel system 105. For example, car wash controller 104 can control car wash machines 112 and resource dispensers 114 to perform automated car wash operations. Car wash controller 104 can receive instructions from data processing system 118 to execute car wash routines based on vehicle features and license plate information. Car wash controller 104 can selectively control the deployment of car wash actuation components based on vehicle features identified from images captured by gate cameras 120 and tunnel cameras 122. For instance, car wash controller 104 can control the application of fluids or physical contact materials onto the vehicle during the car wash routine. Car wash controller 104 can be communicatively coupled with car wash tunnel system 105, data processing system 118, and other components of facility 100 via network 101. Car wash controller 104 can control the service equipment 110 to perform the car wash services according to car wash types designated or dedicated to the operator device. The car wash controller 104 can ensure that the car wash service is performed according to the service request generated by data processing system 118.

Service equipment 110 can include any combination of devices and machinery configured to provide vehicle services in car wash tunnel system 105. For example, service equipment 110 can include car wash machines 112, such as brush rollers, high pressure washers and drying blowers, as well as resource dispensers 114, such as soap and water dispensers, wax dispensers or tire shine dispensers, each of which can be utilized for performing automated car wash operations. Service equipment 110 can be controlled by car wash controller 104 to execute car wash routines based on vehicle features and license plate information. For instance, service equipment 110 can include brushes, sprayers, and dryers that clean and dry the vehicle as it passes through tunnel 140. Service equipment 110 can be configured to apply fluids or physical contact materials onto the vehicle during the car wash routine. Service equipment 110 can be part of car wash tunnel system 105 and can be accessed via lanes 134 and gates 160. Service equipment 110 can be communicatively coupled with car wash controller 104 and data processing system 118 to receive instructions for performing car wash operations.

Car wash machines 112 can include any combination of mechanical devices configured to perform automated car wash operations in car wash tunnel system 105. For example, car wash machines 112 can include automated machinery, such as brushes, rollers, and sprayers that clean the vehicle as the vehicle 130 passes through tunnel 140. Car wash machines 112 can include brush rollers, high-pressure washers, foam applicators, undercarriage washers, wheel cleaners, drying blowers, polishers, wax applicators and tire shiners. Car wash machines 112 can be arranged or deployed within or along the tunnel 140 to provide their designated operations or services to the vehicles 130 passing down the conveyor system 116. Car wash machines 112 can be controlled by car wash controller 104 to execute car wash routines based on vehicle features and license plate information. For instance, car wash machines 112 can apply soap, water, and wax to the vehicle during the car wash routine. Car wash machines 112 can be part of service equipment 110 and can be accessed via lanes 134 and gates 160. Car wash machines 112 can be configured to selectively control the application of fluids or physical contact materials onto the vehicle based on instructions from car wash controller 104. Car wash machines 112 can be communicatively coupled with car wash controller 104 and data processing system 118 to receive instructions for performing car wash operations.

Resource dispenser 114 can include any combination of devices configured to dispense resources, such as fluids, energy or materials, during the car wash routine in car wash tunnel system 105. For example, resource dispenser 114 can include automated dispensers of resources, including sprayers, nozzles, and dispensers that apply soap, water, and wax to the vehicle 130. Resource dispensers 114 can include dispensers for soap, water, wax, foam, tire shine, polish, spot-free rinse, conditioners, sealants, air, including heated air or any other resource used for vehicle service. Resource dispenser 114 can be controlled by car wash controller 104 to execute car wash routines based on vehicle features and license plate information. For instance, resource dispenser 114 can selectively control the application of fluids onto the vehicle during the car wash routine. Resource dispenser 114 can be part of service equipment 110 and can be accessed via lanes 134 and gates 160. Resource dispenser 114 can be configured to apply fluids or materials onto the vehicle based on instructions from car wash controller 104. Resource dispenser 114 can be communicatively coupled with car wash controller 104 and data processing system 118 to receive instructions for performing car wash operations.

Tunnel 140 can include any combination of structures and pathways configured to guide vehicles 130 through car wash tunnel system 105. The tunnel 140 can include a conveyor system 116 or a conveyor belt on which vehicles 130 can be moved, pushed or transported as the car washing is provided by the service equipment 110. Tunnel 140 can include any configurations or arrangements of service equipment 110, such as car wash machines 112 and resource dispensers 114, positioned to provide automated car wash services. For instance, a vehicle 130 identified by a license plate 132 can be coupled with conveyor system 116 and moved through tunnel 140 as service equipment 110 can provide automated car wash services to the vehicle. Tunnel 140 can be part of car wash tunnel system 105 and can be accessed via lanes 134 and gates 160. Tunnel 140 can be configured to guide vehicles 130 through the car wash process based on instructions from car wash controller 104. Tunnel 140 can be communicatively coupled with car wash controller 104 and data processing system 118 to receive instructions for performing car wash operations.

Conveyor system 116 can include any combination of structures and pathways configured to transport vehicles 130 through tunnel 140 in car wash tunnel system 105. The conveyor system 116 can include conveyor belts, tracks, or rollers that move vehicles 130 through tunnel 140. Conveyor system 116 can be controlled by car wash controller 104 to execute car wash routines based on vehicle features and license plate information. For instance, a vehicle 130 identified by a license plate 132 can be coupled with conveyor system 116 and moved through tunnel 140 as service equipment 110 provides car wash services. Conveyor system 116 can be part of tunnel 140 and can be accessed via lanes 134 and gates 160. Conveyor system 116 can be configured to transport vehicles 130 through the car wash process based on instructions from car wash controller 104. Conveyor system 116 can be controlled by a car wash controller 104 allowing vehicles 130 from the queue 142 to enter the tunnel 140. For instance, a conveyor system 116 can be communicatively coupled with a car wash controller 104 or a data processing system 118 to receive instructions to allow vehicles 130 to access or enter the tunnel 140 to receive the services by the car wash tunnel system 105. The conveyor system 116 can include or be coupled with one or more processors that can control one or more components of the conveyor system 116, such as a conveyor belt. The one or more processors can execute one or more instructions to cause the conveyor system 116 to move or propagate a vehicle 130 through the tunnel 140. The conveyor system 116 can include a ramp onto which a vehicle can be driven. The conveyor system 116 can include a conveyor belt mechanism pulling, guiding or moving a vehicle 130 in response to an instruction that the vehicle 130 is to be propagated through the tunnel 140. This can be done, for example, in response to updates to the queue of the car wash tunnel system 105.

Vehicle 130 can include any type of vehicle that can receive services at facility 100. For example, vehicle 130 can be a car, truck, van, or a motorcycle. Vehicle 130 can be identified by a license plate 132 and can be directed through lanes 134 towards car wash tunnel system 105. For instance, a vehicle 130 identified by a license plate 132 can be coupled with conveyor system 116 and moved through tunnel 140 as service equipment 110 provides car wash services. Vehicle 130 can be monitored by gate cameras 120 and tunnel cameras 122 to capture images or videos of the vehicle and its license plate 132. Vehicle 130 can be part of queue 142 and can receive car wash services based on instructions from car wash controller 104. Vehicle 130 can be communicatively coupled with data processing system 118 to receive services according to the entity profiles associated with the vehicle.

License plate 132 can include any plate having a combination of characters or symbols to identify a vehicle 130. For example, a license plate 132 can include alphanumeric characters that uniquely identify a vehicle 130 from a plurality of other vehicles 130. License plate 132 can be captured by gate cameras 120 and tunnel cameras 122 and its characters can be used for identifying the account or profile associated with the vehicle 130. The profile or account identified based on the characteristics of the license plate 132 can identify user information, vehicle information or for instance, a vehicle 130 identified by a license plate 132 can be coupled with conveyor system 116 and moved through tunnel 140 as service equipment 110 provides car wash services. License plate 132 can be used by data processing system 118 to identify the vehicle profile and generate a car wash service request. License plate 132 can be part of the vehicle profile stored in data processing system 118. License plate 132 can be used to determine the identity of the vehicle 130 based on images captured by gate cameras 120 and tunnel cameras 122.

Gate camera 120 can include any combination of hardware and software for capturing images or videos of vehicles 130 and their license plates 132. For example, gate camera 120 can be positioned at the entrance of facility 100 to capture images of vehicles 130 as they approach or pass gates 160. Gate camera 120 can be directed towards region of interest 135, such as a portion of a lane 134 or an area of the lane 134 before a gate 160 barring the vehicle 130 from accessing the car wash tunnel system 105. The gate camera 120 can include a license plate recognition (LPR) camera, including for example at or near a traffic lane 134, at or near a tunnel 140 to facilitate in recognizing license plates 132. Gate camera 120 can be used to identify vehicle features (e.g., colors, shapes, sizes, add-ons or other structures) of vehicles 130 approaching or entering facility 100 or the car wash tunnel system 105. For instance, gate camera 120 can capture images of a vehicle 130 identified by a license plate 132 and transmit the images to data processing system 118. The data processing system 118 can process the images and manage the camera. Gate camera 120 can be communicatively coupled with data processing system 118 to provide images or videos of vehicles 130 and their license plates 132. Gate camera 120 can be used to monitor regions of interest 135 and capture images of vehicles 130 as they enter or merge from various lanes 134 into a queue 142. Gate camera 120 can be coupled with the network 101 of facility system 100 and can provide images for identifying the service to the operator devices 150 according to the entity profiles associated with vehicles 130.

Tunnel camera 122 can include any combination of hardware and software for capturing images or videos of vehicles 130 and their license plates 132 at or near an entrance of a tunnel 140 or within the tunnel 140. For example, tunnel camera 122 can be positioned or directed to a region of interest 135 at an entrance of a tunnel 140 (e.g., at an entrance to the car wash tunnel system 105 building or a structure). The tunnel camera 122 can include a license plate recognition (LPR) camera, including for example at or near a traffic lane 134, at or near a tunnel 140 to facilitate in recognizing license plates 132. The tunnel camera 122 can be positioned inside tunnel 140 to capture images of vehicles 130 as they pass through car wash tunnel system 105. Tunnel camera 122 can be used to identify the license plate 132 and vehicle features of vehicles 130 receiving car wash services. For instance, tunnel camera 122 can capture images of a vehicle 130 identified by a license plate 132 and transmit the images to the data processing system 118. The data processing system 118 can process the images and manage the camera. Tunnel camera 122 can be communicatively coupled with data processing system 118 to provide images or videos of vehicles 130 and their license plates 132. Tunnel camera 122 can be used to monitor the vehicles 130 forming the queue 142 as well as observe the car wash process and capture images of vehicles 130 as they move into or through the tunnel 140. Tunnel camera 122 can be coupled with the network 101 of facility system 100 and can provide images for identifying the service according to the entity profiles associated with vehicles 130.

Queue 142 can include any order or arrangements of vehicles 130 in a line leading into the tunnel 140 of the car wash tunnel system 105. For example, queue 142 can include an order or arrangement of a plurality of vehicles, one following the other, as the vehicles are lined up to enter the tunnel 140. The vehicles 130 can arrive to the queue 142 from lanes 134, as managed or permitted to access by the gates 160 tunnel 140. Queue 142 can be controlled by a data processing system 118 via a car wash controller 104 to manage the entry of vehicles 130 to the tunnel 140 using control of the gates 160. For instance, a vehicle 130 identified by a license plate 132 can be permitted to proceed to the queue 142 by controlling the gate 160 to allow the vehicle 130 to access the queue 142. The data processing system 118 can maintain the queue 142 representation (e.g., vehicle order) using images from the cameras 120 or 122. The queue 142 can be monitored by both the gate cameras 120 and tunnel cameras 122 to keep track of any changes to the queue 142, using features for recognizing license plates 132. Queue 142 can be maintained and managed by the data processing system 118 to ensure that each vehicle receives its own designated service.

Lanes 134 can include any combination of pathways and structures configured to direct vehicle traffic towards car wash tunnel system 105. For example, lanes 134 can include outdoor areas with pathways guiding vehicles 130 towards gates 160 and tunnel 140. Lanes 134 can be used to manage the flow of vehicles 130 arriving for service at facility 100. For instance, lanes 134 can include a first lane 134A guiding a first vehicle 130A identified by a first license plate 132A towards a first gate 160A. Lanes 134 can include a second lane 134B guiding a second vehicle 130B identified by a second license plate 132B towards a second gate 160B. Lanes 134 can include regions of interest 135 monitored by gate cameras 120 to capture images or videos of vehicles 130 as they approach or pass gates 160. Lanes 134 can be part of facility 100 and can be accessed via pathways and outdoor areas. Lanes 134 can be communicatively coupled with data processing system 118 to manage the flow of vehicles 130 towards the car wash tunnel system 105. It should be appreciated that lanes can include any pathway on which vehicles can move and the lanes may not be defined using barriers or other physical structures or demarcations. It should also be understood that the lanes may not directly guide or direct the vehicles.

Gates 160 can include any combination of structures and mechanisms configured to control the access of vehicles 130 to queue 142 and tunnel 140 in car wash tunnel system 105. For example, gates 160 can include barriers, turnstiles, visible indicators/lights, or electronic gates that regulate the entry of vehicles 130. Gates 160 can be controlled by car wash controller 104 to manage the access of vehicles 130 based on vehicle features and license plate information. For instance, a vehicle 130 identified by a license plate 132 can be allowed to pass through gate 160 and enter queue 142 based on instructions from car wash controller 104. The instructions can be generated based on a successful processing of a transaction by the third party server 190 operating as a point of sale (POS) device for the facility 100. Gates 160 can be monitored by gate cameras 120 to capture images or videos of vehicles 130 as they approach or pass the gates. Gates 160 can be part of facility 100 and can be accessed via lanes 134 and pathways. Gates 160 can be communicatively coupled with data processing system 118 to control the access of vehicles 130 to queue 142 and tunnel 140 based on instructions from car wash controller 104.

Regions of interest 135 can include any areas and zones within facility 100 that are monitored or recorded by cameras, such as for capturing images or videos of vehicles 130. For example, regions of interest 135 can include areas near gates 160, lanes 134, and tunnel 140. Regions of interest 135 can be monitored by gate cameras 120 and tunnel cameras 122 to capture images or videos of vehicles 130 and their license plates 132. For instance, a region of interest 135A can be viewed by a gate camera 120A capturing images of a vehicle 130A identified by a license plate 132A as it approaches gate 160A. Regions of interest 135 can be used to identify vehicle features and license plate information for generating car wash service requests. Regions of interest 135 can be part of facility 100 and can be accessed via pathways and outdoor areas. Regions of interest 135 can be communicatively coupled with data processing system 118 to provide images or videos of vehicles 130 for identifying the service according to the entity profiles associated with the vehicles.

Data processing system 118 can include any combination of hardware and software for processing data and managing the operations of facility 100. Data processing system 118 can include one or more computing environments, servers, databases, and applications for storing and processing vehicle profiles, license plate information, and service requests. The data processing system 118 can be any computing device, collection of servers, data centers, among others, which include one or more processors coupled with memory storing instructions and data configured to implement or complete the tasks and processes described herein. The data processing system 118 can be electrically coupled to each of the components within the service facility 100 to control or monitor the reception and transmission of different data or signals within the service facility 100. The data processing system 118 can be deployed or provided within building or a structure housing the car wash tunnel system 105, or outside of it, such on a cloud based system, including a Software as a Service (Saas). The data processing system 118 can be connected to the devices 150 via the network 101 (e.g., the internet or a Wi-Fi network).

Data processing system 118 can be used to identify vehicle features and generate car wash service requests based on images captured by gate cameras 120 and tunnel cameras 122. Data processing system 118 can receive images of a vehicle 130 identified by a license plate 132 and generate a car wash service request based on the vehicle profile. Data processing system 118 can be communicatively coupled with car wash controller 104, gate cameras 120, tunnel cameras 122, operator devices 150, third party servers 190, and admin devices 162 via network 101. Data processing system 118 can manage the operations of facility 100 by processing data and providing instructions for performing car wash operations, including sending instructions to car wash controller 104 to adjust, manage or operate various services equipment 110. Data processing system 118 can ensure that the car wash service is performed according to the service request generated based on the entity profiles associated with the vehicles 130.

Admin device 162 can include any combination of hardware and software for providing administrative overview and services to the facility system 100 or any of its components (e.g., data processing system 118, operator devices 150. For example, admin device 162 can include computers, tablets, or smartphones used by administrators to monitor and manage the operations of facility 100. Admin device 162 can be used to access data processing system 118, car wash controller 104, and other components of facility 100. For instance, admin device 162 can be used to view images or videos captured by gate cameras 120 and tunnel cameras 122, monitor the status of queue 142, and manage the flow of vehicles 130 through lanes 134 and gates 160. Admin device 162 can be communicatively coupled with data processing system 118, operator devices 150, and third party servers 190 via network 101. Admin device 162 can provide administrative services such as updating vehicle profiles, generating reports, and managing entity profiles. Admin device 162 can ensure that the operations of facility 100 are performed efficiently and according to the service requests generated based on the entity profiles associated with the vehicles 130.

Third party servers 190 can include any combination of hardware and software for executing third party services, such as transactions or POS operations for the facility system 100. For example, third party servers 190 can include servers, databases, and applications used by third party service providers to process transaction operations (e.g., exchange and validate credit card payment data of drivers of the vehicles), manage entity profiles, and provide additional services. Third party servers 190 can be used to execute transaction operations based on the service requests generated by data processing system 118. For instance, third party servers 190 can process payments for car wash services provided to vehicles 130 identified by license plates 132. Third party servers 190 can be communicatively coupled with data processing system 118, operator devices 150, and admin devices 162 via network 101. Third party servers 190 can provide additional services such as loyalty programs, promotions, and customer support. Third party servers 190 can ensure that the transaction operations and additional services are performed according to the service requests generated based on the entity profiles associated with the vehicles 130.

Operator devices 150 can include any combination of hardware and software used by operators of the facility 100 to interact with the facility system 100. Operator devices 150 can include smartphones, tablets, laptops, or desktop computers operated by users, such as employees or service providers of the facility 100. Operator devices 150 can execute applications 152 that allow users to access services provided by facility 100, including scheduling car wash services, providing attention to entity accounts of the drivers of the vehicles 130 or managing vehicle data or gate access at gates 160. For example, a user (e.g., an operator) can use a mobile application executing on an operator device 150 to access a graphical user interface to review the state of the lanes 134 or to schedule a car wash service for a vehicle 130 identified by a license plate 132. Operator devices 150 can be communicatively coupled with data processing system 118, car wash controller 104, and third party servers 190 (e.g., POS devices) via one or more networks 101. Operator devices 150 can receive and display data from data processing system 118 or gate cameras 120 and tunnel cameras 122, including images or videos of the vehicles at various lanes 134 and display this data to the user via a graphical user interface (GUI) of the operator device 150. Operator devices 150 can transmit data to data processing system 118, such as service requests or updates to entity accounts. Operator devices 150 can provide users with a convenient way to access and manage the services or vehicle data utilized at the facility 100.

Applications 152 can include any combination of software programs executed on operator devices 150 to provide users (e.g., operators or employees of the facility) with access to the services of facility system 100. For example, applications 152 can include mobile applications, web applications, or desktop applications. Applications 152 can provide graphical user interfaces (GU Is) that allow users to interact with the services provided by facility 100. For instance, a mobile application 152 can present a GUI that displays data objects representing vehicles 130 in different lanes 134, including images and license plate information of the vehicles 130. Applications 152 can allow users to schedule car wash services, manage client accounts, and view the status of their vehicles 130. Applications 152 can be communicatively coupled with data processing system 118, car wash controller 104, and third party servers 190 via network 101. Applications 152 can receive data from data processing system 118, such as service requests or updates to vehicle profiles, and display this data to the user. Applications 152 can provide a GUI to the user to generate or select instructions, such as an instruction to open a gate 160, or provide notifications, such as a notification that a particular vehicle 130 in a particular lane 134 is receiving assistance for a pending issue. Applications 152 can provide users with a user-friendly interface to access and manage the services provided by facility 100.

Network 101 can include any combination of wired and wireless network types and connections for facilitating communication within facility system 100. For example, network 101 can include wired connections such as Ethernet cables, fiber optic cables, and coaxial cables to provide high-speed and reliable data transmission between components like data processing system 118, car wash controller 104, and third party servers 190. Network 101 can include wireless connections such as Wi-Fi, Bluetooth, and cellular networks to enable flexible and convenient communication with operator devices 150 and admin devices 162. For instance, Wi-Fi can be used to connect gate cameras 120 and tunnel cameras 122 to data processing system 118, allowing for real-time transmission of images and videos of vehicles 130 and their license plates 132. Network 101 can support various network protocols and standards to ensure seamless integration and interoperability between different components of facility system 100. Additionally, network 101 can provide secure and encrypted communication channels to protect sensitive data and ensure the privacy of client accounts associated with vehicles 130. By incorporating both wired and wireless connections, network 101 can offer a robust and versatile infrastructure for managing the operations of facility 100.

Figure 2:
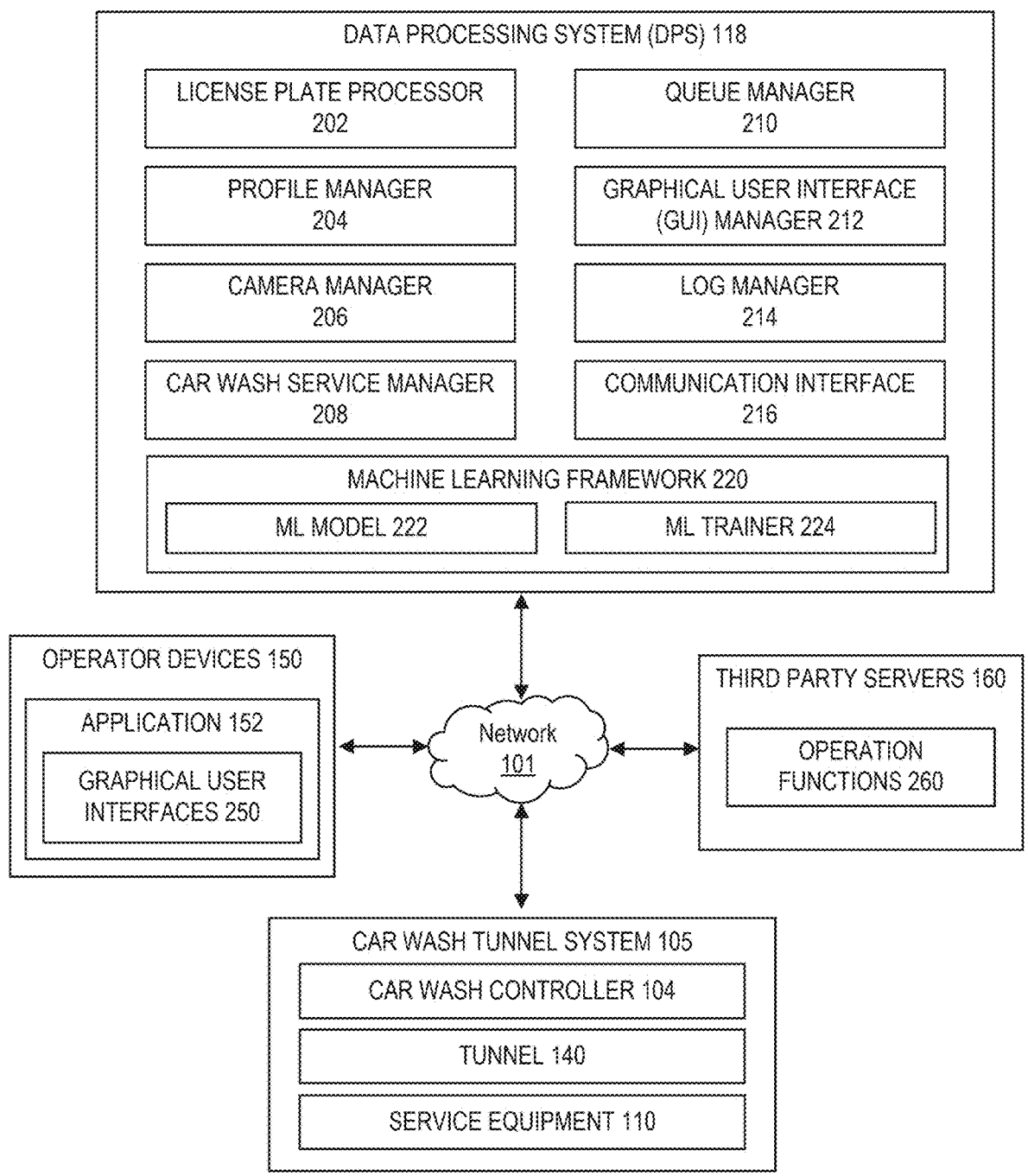
FIG. 2 is an example of a data processing system of the computing environment that can be used for implementing the technical solutions.

FIG. 2 illustrates an example system 200 for implementing the technical solutions of the facility system 100. The example system 200 can include a computing environment for implementing various functionalities of the technical solutions, such as automated vehicle license plate recognition, service facility queue adjustment based on a queue of a remote application, graphical user interface based management of vehicle lanes traffic at service facilities, or automated control of car wash services. The example system 200 can include one or more data processing systems 118, operator devices 150, third party servers 164 and car wash tunnel systems 105 that can be configured to communicate with each other via a network 101.

A data processing system 118 can include one or more of camera managers 206 to manage image capture devices, such as gate cameras 120 or tunnel cameras 122 to capture image or video data for processing by the data processing system. The data processing system 118 can include one or more of license plate processors 202 to apply image recognition to images captured by the cameras 120. A license plate processor 202 and a camera manager 206 can utilize machine learning to identify license plate characters or specific vehicle characteristics, as well as implement character replacement schema functionalities to utilize replacement characters to more reliably and efficiently identify license plates 132 for various vehicles 130.

The data processing system 118 can include one or more of profile managers 204 for managing profiles of vehicles or entities (e.g., data on vehicles and drivers), which can be used to facilitate automation of vehicle services customized for individual vehicles or drivers. The data processing system 118 can include one or more car wash service managers 208 for providing or managing car wash routines for different types of car wash services, based on the vehicle 130 (e.g., identified using a license plate processor 202) or entity profiles (e.g., data of the specific vehicle specifying car wash routines or preferences for the vehicle).

The data processing system 118 can include one or more queue managers 210 for monitoring or managing queues 142 (e.g., queues of the car wash tunnel system 105) to ensure that the designated vehicles 130 receive their intended and assigned services. A queue manager 210 can utilize machine learning and integrate with the license plate processor 202 and the camera manager 206 to track individual vehicles 130 at the facility and continuously update the vehicle queue to track the vehicles entering the tunnel 140 and maintain the order of their corresponding car wash routines.

The data processing system 118 can include one or more graphical user interface (GUI) managers 212 for managing graphical user interfaces (GUIs) 250 of the applications 152 executing on operator devices 150. The GUIs 250 can be configured to provide updated information on vehicles passing through the facility, including keeping track of vehicles 130 at the lanes 134 and facilitating timely and efficient management addressing of issues among the operators (e.g., facility staff) of the operator devices 150. The data processing system 118 can include one or more log managers 214 for generating and maintain logs or reports for the given services, as well as one or more communication interfaces 216 for facilitating interfacing or communication with other components of the system 200, such as via the network 101. The log manager 214 can log vehicle visits to the facility, maintain a series of videos or images of the vehicles 130 utilized during the visits and provide data on the vehicle over time. The data processing system 118 can include one or more machine learning (ML) frameworks 220 that can include one or more ML models 222 that can be trained by one or more ML trainers 224 to perform various tasks or operations of the data processing system components, such as for example license plate data recognition of a license plate processor 202 or vehicle identification for maintaining a queue of a queue manager 210.

An operator device 150 can be used by an operator (e.g., an employee of the facility) and execute one or more applications 152 having one or more GUIs 250 that can allow the operators to monitor the statuses of the lanes 134 or the vehicles 130 and timely address any pending issues. The issues may involve or relate to, for example, operation functions 260, such as POS transactions that can be executed via third party servers 164 (e.g., POS terminals) which the vehicle drivers may utilize to access or setup car wash services. For instance, the operation functions 260 can include or provide operations for processing a credit card transaction or triggering a billing action of an account associated with the vehicle. The car wash tunnel system 105 can be controlled, managed, monitored or operated by the data processing system 118 or operator devices 150 to improve the system operation or facilitate the timely execution of operation functions 260.

ML framework 220 can include any combination of hardware and software for providing or implementing any type and form of ML or artificial intelligence (AI) functionalities of the data processing system. The M L framework 220 can manage and provide M L trainers 224 for training M L models 222 to perform functionalities of any of the components of the data processing system 118 (e.g., license plate processor 202, camera manager 206, queue manager 210, or any other data processing system component or feature). For example, an ML framework 220 can utilize an ML trainer 224 to train an M L model 222 to detect, determine or identify license plate data or vehicle characteristics or features in order to identify vehicles. The ML trainers 224 can train the ML models 222 to detect updates in the order of vehicles in a queue entering a tunnel 140 of a car wash facility, thereby maintaining a correct representation of the order vehicles entering the car wash tunnel. ML models 222 can be trained to select or arrange one or more (e.g., a sequence of) car wash routines for implementing a particular (e.g., customized or desired) car wash service to the vehicle, based on the vehicle data or profile preferences.

The ML models 222 can include any combination of one or more neural networks, decision-making models, linear regression models, natural language models, random forests, classification models, generative AI models, reinforcement learning models, clustering models, neighbor models, decision trees, probabilistic models, classifier models, or other such models. For example, the models 222 include natural language processing (e.g., support vector machine (SVM), Bag of Words, Counter Vector, Word2Vec, k-nearest neighbors (KNN) classification, long short erm memory (LSTM)), object detection and image identification models (e.g., mask region-based convolutional neural network (R-CNN), CNN, single shot detector (SSD), deep learning CNN with Modified National Institute of Standards and Technology (MNIST), RNN based long short term memory (LSTM), Hidden Markov Models, You Only Look Once (Y OLO), LayoutLM) (classification ad clustering models (e.g., random forest, XGBBoost, k-means clustering, DBScan, isolation forests, segmented regression, sum of subsets 0/1 Knapsack, Backtracking, Time series, transferable contextual bandit) or other models such as named entity recognition, term frequency-inverse document frequency (TF-IDF), stochastic gradient descent, Naïve Bayes Classifier, cosine similarity, multi-layer perceptron, sentence transformer, data parser, conditional random field model, Bidirectional Encoder Representations from Transformers (BERT), among others.

The ML models 222 can include generative AI models, also referred to as generative AI models 222, which can include any machine learning systems configured to create new content, such as text, images, or audio, by learning patterns from the data stored in a storage or a database (e.g., training datasets). The generative AI models 222 can be trained using techniques, such as supervised learning, unsupervised learning, and reinforcement learning. Generative AI models 222 can utilize data set from the stored data to create logical inferences between various complex structures in the data set to generate coherent outputs for prompts input into the models 222.

The ML models 222 implemented as generative AI models can include any machine learning (ML) or artificial intelligence (AI) model designed to generate content or new content, such as text, images, or code, by learning patterns and structures from existing data. Such ML model 222 (e.g., a generative AI models) can include any model, a computational system or an algorithm that can learn patterns from data (e.g., chunks of data from various input images, videos, documents, computer code, templates, forms, etc.) and make predictions or perform tasks without being explicitly programmed to perform such tasks. The generative AI model 222 can include, utilize or refer to a large language model. The generative AI model 222 can be trained using a dataset of documents (e.g., text, images, videos, audio or other data). The generative AI model 222 can be designed to understand and extract relevant information from the dataset. The generative AI model 222 can leverage natural language processing techniques and pattern recognition to comprehend the context and intent of a prompt (e.g., one or more instructions), which can be used as input into the M L model 222 to trigger the desired output or result.

The ML model 222, including for example a generative AI model, can be designed, constructed, utilize or include a transformer architecture with one or more of a self-attention mechanism (e.g., allowing the model to weigh the importance of different words or tokens in a sentence when encoding a word at a particular position), positional encoding, encoder and decoder (multiple layers containing multi-head self-attention mechanisms and feedforward neural networks). For example, each layer in the encoder and decoder can include a fully connected feed-forward network, applied independently to each position. The data processing system 118 can apply layer normalization to the output of the attention and feed-forward sub-layers to stabilize and improve the speed with which the generative AI model 222 is trained. The data processing system 118 can leverage any residual connections to facilitate preserving gradients during backpropagation, thereby aiding in the training of the deep networks. Transformer architecture can include, for example, a generative pre-trained transformer, a bidirectional encoder representations from transformers, transformer-XL (e.g., using recurrence to capture longer-term dependencies beyond a fixed-length context window), text-to-text transfer transformer, ML trainers 224 can include any combination of hardware and software for training ML models 222. ML trainers 224 can use datasets including images, videos, documents or character strings to identify, detect or monitor license plate data, vehicle data, user data, vehicle queues or any other set of information handled by the data processing system 118. Through training, a generative ML model 222, also referred to as a generative AI model 222, can learn or adjust its understanding of mapping embeddings to particular issues (e.g., vehicle features or characteristics identified via images), by adjusting its internal parameters. For example, the model 222 can be trained using datasets comprising vehicle or license plate data. The internal parameters can include numerical values of a generative AI model that the model learns and adjusts during training to optimize its performance and make more accurate predictions. Such training and can include iteratively presenting the various data chunks or documents of the dataset (e.g., or their chunks, embeddings) to the generative AI model 222, comparing its predictions with the known correct answers, and updating the model's parameters to minimize the prediction errors. By learning from the embeddings of the dataset data chunks, the generative AI model 222 can gain the ability to generalize its knowledge and make accurate predictions or provide relevant insights when presented with prompts.

Figure 3:
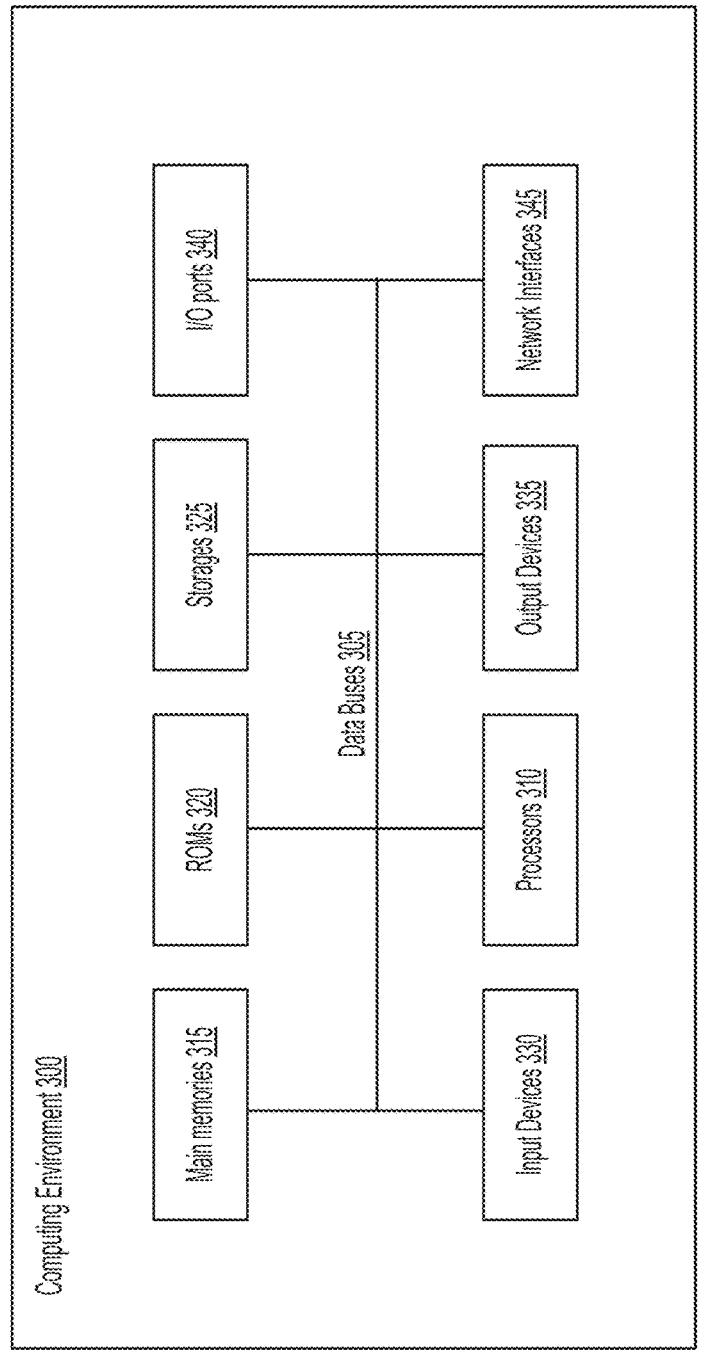
FIG. 3 is an example block diagram of a computing environment in which the data processing system and the features of the technical solutions can be implemented.

FIG. 3 illustrates an example block diagram of a computing environment 300, also referred to as a computing or a computer system 300, using which any of the computational components of the example system 200 can be implemented. For instance, the computing environment 300 can be utilized to implement or execute any portion of a data processing system 118, an operator device 150, a third party server 190 or a car wash tunnel system 105. Computer system 300 can include or be used to implement any computation or processing (e.g., operation, command, protocol, or data processing) described herein, including any component of a data processing system 118. For instance, instructions, computer code or data stored in memories of the computing system 300 (e.g., 315, 320 or 325) can be utilized to configure processors of the computing system (e.g., 310) to execute any of the functionalities of the data processing system 118 described herein.

Computing system 300 can include at least one bus data bus 305 or other communication component for communicating information and at least one processor 310 or processing circuit coupled to the data bus 305 for processing information. Computing system 300 can include one or more processors 310 or processing circuits coupled to the data bus 305 for exchanging or processing data or information. The processors 310 can include any processing circuitry, including, for example, graphics processing units (GPUs) or any circuitry or processors configured for executing machine learning or artificial intelligence models. Computing system 300 can include one or more main memories 315, such as a random-access memory (RAM), dynamic RAM (DRAM) or other dynamic storage device, which can be coupled to the data bus 305 for storing information and instructions to be executed by the processor(s) 310. Main memory 315 can be used for storing information (e.g., data, computer code, commands, or instructions) during execution of instructions by the processor(s) 310.

Computing system 300 can include one or more read only memories (ROM s) 320 or other static storage device coupled to the bus 305 for storing static information and instructions for the processor(s) 310. Storage 325 can include any storage device, such as a solid-state device, magnetic disk, or optical disk, which can be coupled to the data bus 305 to persistently store information and instructions. Storage 325 can be used, for example, to provide data repositories.

Computing system 300 can be coupled via the data bus 305 to one or more output devices 335, such as speakers or displays (e.g., liquid crystal display or active-matrix display) for displaying or providing information to a user. Input devices 330, such as keyboards, touch screens or voice interfaces, can be coupled to the data bus 305 for communicating information and commands to the processor(s) 310. Input device 330 can include, for example, a touch screen display (e.g., output device 335). Input device 330 can include a cursor control, such as a mouse, a trackball, or cursor direction keys, for communicating direction information and command selections to the processor(s) 310 for controlling cursor movement on a display.

Computer system 300 can include input/output ports 340, also referred to as I/O ports 340, can include physical interfaces that facilitate or provide communication between external or peripheral devices and processor(s) 310 and/or memory 315. I/O ports 340 can be connected to data bus 305, allowing the transfer of data between the processor(s) 310, memories 315, and any external devices (e.g., keyboards, mice, printers, and external storage devices). Computer system 300 can include one or more network interfaces 345 coupled via data buses 305. Network interfaces 345 can include any physical or virtual components enabling communication between the computer system 300 and any external networks (e.g., the Internet). Network interface 345 can provide transfer of data between the processor(s) 310, memories 315 and any external networks.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors 310 in a multi-processing arrangement can be employed to execute the instructions contained in main memory 315. Hard-wired circuitry can be used in place of or in combination with software instructions together with the systems and methods described herein. describes systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

B. Systems and Methods for Automated Control of Actuation Components and Resources in Car Wash Facilities When a vehicle 130 enters a region of interest 135 within a proximity of a gate 160, the technical solutions can utilize a gate camera 120 to capture one or more images or video streams of the vehicle. Once captured, the image data processing system can analyze this visual data to identify a license plate 132 to determine a license plate number. Vehicles 130 may have different features as well as different types of car wash service requests. Without identifying the features or the type of car wash service, the car wash tunnel system 105 may provide an incorrect service to the vehicle 130 and inadvertently actuate components that can damage parts of the vehicle 130. For example, without identifying features on a roof of the vehicle 130, the car wash tunnel system 105 may actuate overhead components that can damage at least one of the roof or features on the roof of the vehicle 130.

To overcome such challenges, the technical solutions of this disclosure can identify license plate information and features of the vehicle based on the one or more images captured by one or more cameras. For instance, images of a vehicle can be captured along the path of different lanes or entrance to the car wash tunnel by one or more cameras. The images can be utilized to extract license plate information or vehicle features or characteristics (e.g., shape, size, color or vehicle type) to identify the vehicle. Once identified, the technical solutions can identify or select a vehicle profile associated with the license plate information or the vehicle features or characteristics, and determine the type of car wash service to provide to the vehicle. The technical solutions can selectively actuate one or more components of the car wash system within a car wash tunnel based on the features of the vehicle. For example, responsive to the roof of the vehicle 130 including a roof rack, the car wash tunnel system can actuate a subset of the system components configured to service the roof of the vehicle. In doing so, the technical solutions can utilize machine learning image recognition to accommodate various configurations and types of vehicles, minimizing the chance of errors or collisions. The technical solutions can capture additional images of the vehicle prior to the vehicle entering the car wash tunnel system to ensure that the car wash tunnel system is providing a correct (e.g., based on a respective vehicle profile) car wash service to the vehicle.

Figure 4:
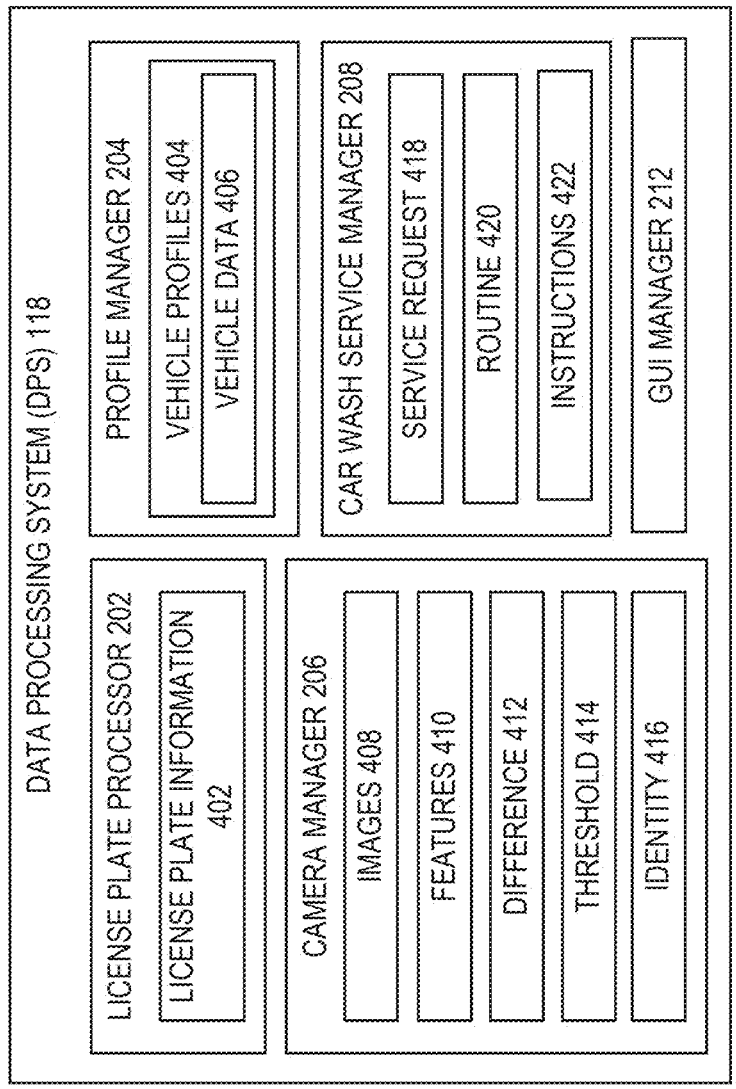
FIG. 4 is an example block diagram of a system for automated control of actuation components in car wash facilities.

FIG. 4 illustrates an example system 400 for implementing the technical solutions of the facility system 100. The example system 400 can include a system for implementing automated control of actuation components in car wash facilities for use at service facilities, such as a car wash. The automated control of actuation component features can include, for example, feature detection systems for identifying features of a vehicle and component control systems to selectively deploy actuation components based on the vehicle features. The example system 400 include one or more data processing systems 118, which can be integrated or implemented using any combination of one or more instances of the system 200 of FIG. 2 or the system 300 of FIG. 3, in the context of a facility 100 of FIG. 1. The data processing system 118 can include one or more ML models 222 to perform operations described further herein.

The data processing system 118 can include one or more license plate processors 202 for capturing and processing license plate information 402, such as a license plate number of vehicle license plates 132. The data processing system 118 can include one or more profile managers 204 which can include or be implemented using one or more databases storing one or more vehicle profiles 404 for one or more vehicles 130. Each vehicle profile 404 can include or correspond to vehicle data 406, such as features of different vehicles 130 associated with user accounts. The data processing system 118 can include one or more camera managers 206 communicatively coupled to at least the one or more gate cameras 120 or tunnel cameras 122. The camera manager 206 can capture, receive, process or determine various imaging data such as one or more images 408 (e.g., images of the vehicle 130), one or more features 410 (e.g., features of the vehicle 130), one or more differences 412 (e.g., difference between a stored representation and captured representation of the vehicle 130), one or more thresholds 414 (e.g., to compare the differences to), and one or more identities 416 (e.g., identity of the vehicle 130). The data processing system 118 can include one or more car wash service managers 208 providing services (e.g., car washes) to the vehicle 130. The car wash service manager 208 can include various car wash service data, such as one or more service requests 418 (e.g., requests to provide car wash services), one or more car wash routines 420 (e.g., number and order of services or operations to provide to the vehicle 130), and one or more instructions 422 (e.g., to control deployment of actuation components). The data processing system 118 can include one or more GUI managers 212 to generate and provide information to one or more GUIs 250 that can operate on one or more operator devices 150.

The camera manager 206 can include any combination of hardware and software configured to receive, process and store various images 408 captured by gate cameras 120 or tunnel cameras 122. The camera manager 206 can receive, via a first image capture device such as a gate camera 120A, one or more first images of a vehicle 130 and a license plate 132 of the vehicle while the vehicle 130 is at a first region of interest 135 at a service facility that includes a car wash tunnel system 105. The camera manager 206 can receive, via a second image capture device such as a tunnel camera 122, one or more second images of the same license plate 132 of the same vehicle 130 while this vehicle is at a second region of interest 135 at the service facility. The second region of interest 135 can be an entrance into a tunnel 140. The camera manager can match license plate information 402 or images 408 between different sections (e.g., regions of interest) along the facility to confirm the location, movement and identity of the vehicle 130 to verify which vehicle is entering the tunnel 140 in which order in the queue. The camera manager 206 can be communicatively coupled with at least one image capture device, such as the gate cameras 120 (e.g., first image capture device) and the tunnel cameras 122 (e.g., second image capture device). The camera manager 206 can receive or manage capturing of the images 408 from various gate cameras 120 or the tunnel camera 122, process the images and store the images 408 via an image or a video stream.

The camera manager 206 can be communicatively coupled with a gate camera 120, which can be positioned at gate 160 of a lane 134, via which a vehicle 130 can approach a car wash tunnel system 105. The camera manager 206 can be communicatively coupled with a tunnel camera 122 which can be positioned at an entrance of the tunnel 140 and be directed to a queue or a line of vehicles 130 entering the tunnel 140. The gate area of the lane 134 via which the vehicle approaches the car wash tunnel system 105 can be referred to as a first region of interest 135, while the entrance of the tunnel 140 can be referred to as a second region of the service facility 100. The first set of images can be captured at a gate region, while the second set of images can be captured to confirm, verify, track or identify the same vehicle 130 entering the car wash system inside the tunnel 140. By matching the images 408 along the path of the vehicle (e.g., between the gate 160 and entrance to the tunnel 140), the data processing system 118 can identify, verify or determine which vehicle is entering the tunnel 140. The camera manager 206 can monitor the entrance of the tunnel 140 using one or more tunnel cameras 122 and can instruct the one or more tunnel cameras 122 to capture the images 408 of the vehicle 130 upon detection of the vehicle 130 at the entrance of the tunnel 140.

The camera manager 206 can monitor any region of interest 135 using the gate cameras 120 or tunnel cameras 122. For instance, the camera manager 206 can instruct at least one gate camera 120 to capture the images 408 of the vehicle 130 upon detection of the vehicle 130 in the region of interest 135. The camera manager 206 can include the ML model 222 configured to detect the vehicle 130 or various vehicle features or characteristics (e.g., vehicle size, shape, added components or features or vehicle damage, such as body dents). The camera manager 206 can receive and store images 408 transmitted by the gate cameras 120 of the vehicle 130 in the region of interest 135 in order to determine the car wash routines 420 to apply. For instance, the camera manager 206 can receive and store images 408 of the vehicle 130 from the gate cameras 120 in at least one lane 134. The region of interest 135 can be referred to as a first region of the service facility 100. The camera manager 206 can continually receive images 408 from at least one of the gate cameras 120 or the tunnel camera 122 and use these images to track the vehicle (e.g., via matching images or matching vehicle features) to verify the identity of the vehicles 130 entering the car was system. Once vehicles are identified and then confirmed via the tunnel camera 122 (e.g., via matching images from multiple regions of interest 135 of the facility), the data processing system 118 can apply the car wash routines 420 intended to the respective identified vehicle. The car wash routines 420 can include, for example issuing instructions 422 to selectively deploy car wash actuation components (e.g., car wash machines 112 or resource dispensers 114) to achieve the desired car wash services for each individual vehicle 130.

The camera manager 206 can provide the images 408 of the vehicle 130 in the regions of interest 135 (e.g., at the gate 160) and at the entrance of the tunnel 140 to the license plate processor 202 to determine the license plate information 402 and features 410 and identify the vehicles 130 in a queue or a line. The images 408 of the vehicle 130 captured in the region of interest 135 by at least one gate camera 120 can be referred to as first images. The images 408 of the vehicle 130 captured at the entrance of the tunnel 140 by the tunnel camera 122 can be referred to as second images. The first images can be captured at a first time interval and the second images can be captured at a second time interval, which can be subsequent to the first time interval. As such both the first images and the second images can include the same group of vehicles 130 as the vehicle 130 move through the service facility 100 (e.g., progress through the queue entering the tunnel 140).

The images can be captured during specific time intervals, such as every set time duration (e.g., sixty frames per second, thirty frames per second, ten frames per second, once every second, once every five or ten seconds or every minute). In some implementations, the second time interval is variable based on a number of vehicles 130 at the service facility 100. The first time interval can be the same or different than the second time interval. The first time interval and the second time interval can depend on at least one of an angle of the tunnel camera 122 and the gate cameras 120 and the number of vehicles 130. For example, in cases where the vehicle 130 is the only vehicle 130 at the service facility, the first time interval and the second time interval are less than compared to cases where the vehicle 130 is one of ten vehicles 130 since the vehicle 130 waits to enter the tunnel 140.

The camera manager 206 can include one or more M L models 222 to determine the features 410, the difference 412, and the identity 416 of the vehicle 130 according to the images 408. The camera manager 206 can input the images 408 into the ML models 222, and the ML models 222 can output the features 410, the difference 412, and the identity 416. The ML model 222 can be, for example, an image recognition or object detection model to generate the features 410, the difference 412, and the identity 416. The ML models 222 can include the threshold 406 and can determine whether the difference 412 satisfies the threshold 313.

The camera manager 206 can include at least one of a log or a database to store the images 408. The camera manager 206 can store each of the images 408 captured. In some implementations, based on the license plate information 402 determined by the license plate processor 202, the camera manager 206 stores the images 408 in a respective vehicle profile 404 based on the license plate information 402. The camera manager 206 can tag (e.g., associate) each of the images 408 with respective license plate information 402. For example, the license plate processor 202 provides the license plate information 402 to the camera manager 206 upon identification, and the camera manager 206 associates and stores the images 408 with the license plate information 402.

Based on the images 408, the camera manager 206 can identify various vehicle information. For example, the camera manager 206 can identify one or more features 410 of the vehicle 130 from the images 408. The camera manager 206 can include the ML models 222 to identify the features. For example, the camera manager 206 includes at least one image recognition and object detection model to identify the features 410. The features 410 can include any characteristic that can identify a vehicle, such as a size or shape of a vehicle, vehicle type, make or model or any dents or damage on the vehicle. The features 410 can include at least one of a physical object configured, included or attached to the vehicle 130, such as a roof rack, a bicycle rack, a cargo basket, a spoiler component, or any other feature or a characteristic of the vehicle 130. The features 410 can include combinations of one of a vehicle attachment, a sticker, a color of the vehicle 130, a shape of the vehicle 130 (e.g., long body, truck), a size of the vehicle 130 (e.g., small, midsize or a large sport utility vehicle), or a vehicle dimension (e.g., height, width, length). For example, the features 410 can include elements on a roof of the vehicle 130 (e.g., roof rack), a tire type, height, width, or color of the vehicle 130 (e.g., black, white), among others. The features 410 can correspond to a paint of the vehicle 130. For example, the color of the vehicle 130 can indicate a specific paint of the vehicle 130. In some implementations, an appearance of the vehicle 130 can correspond to the paint of the vehicle 130, such as the vehicle 130 appearing glossy, metallic, matte, etc.

The camera manager 206 can determine a location of a subset of the features 410 on the vehicle 130. For example, the camera manager 206 can determine that one or more features 410 are installed on a roof of the vehicle 130 such as a roof rack. As another example, the camera manager 206 can determine that one or more features 410 are installed on a front or a back of the vehicle 130, such as a bike rack. The camera manager 206 can determine the location by, for example, the ML models 222 generating a bounding box around each of the features 410. The camera manager 206, upon identification of the features 410, can store information regarding the features 410 in the data structure of the vehicle profile 404. The camera manager 206 can store the features 410 in the entry for vehicle features of the data structure. In some implementations, the entry for vehicle features of the data structure already includes features 410, and the camera manager 206 adds the features 410 that are different than the features 410 already in the entry for vehicle features. The camera manager 206 transmits the features 410 to the profile manager 204, and the profile manager 204 compares the features 410 with the features 410 in the data structure and adds the features 410 that are different than the features 410 in the data structure. The profile manager 204 can remove the features in the data structure that are different than the features 410 received from the camera manager 206.

The camera manager 206 can identify a difference 412 in images of vehicles from those expected to be identified, such as by comparing or matching the images 408 captured from the cameras with the description of vehicle features or images in the vehicle data 406. The difference 412 can be any difference between vehicle data (e.g., description, make, model or images) stored in a vehicle profile 404 and an image captured. The difference can be or refer to a difference between a body (e.g., dimensions, features, size) of the vehicle 130 and a representation of the body of the vehicle 130 stored in the vehicle profile 404. The difference can be a difference between vehicle data 406 (e.g., make, model, color) of a vehicle associated with a license plate in a vehicle profile 404 and the make, model or color of the vehicle captured in an image with the same license plate (e.g., a license plate was moved to a different vehicle than the one previously recorded with the same license plate). For example, the camera manager 206 receives the representation of the body of the vehicle 130 from the profile manager 204 and compares the representation with the body of the vehicle 130 as depicted in the images 408. The profile manager 204 can provide the representation in response to receiving the features 410 from the camera manager 206. The camera manager 206 can include the M L models 222, such as at least one image comparison model to compute a structural similarity index measure (SSIM) between the representation and the images 408 or feature matching between the representation and the images 408. The ML models 222 can receive the images 408 and representation of the body of the vehicle 130 as an input, and determine the difference 412 as an output. The camera manager 206 can determine the difference 412 after receiving the images 408 and the license plate processor 202 determining the license plate information 402. For example, the profile manager 204 can determine the vehicle profile 404 associated with the license plate information 402 and provide the camera manager 206 with the representation to determine the difference 412.

The camera manager 206 can include or utilize a threshold 414 for determining if differences detected are sufficiently large to take action. For instance, after matching, determining or identifying a difference 412, the camera manager 206 can compare the difference 412 to the threshold 414. The camera manager 206 can determine whether the difference 412 satisfies the threshold 414. The threshold 414 can be indicative of a significant difference between the body of the vehicle 130 shown in the images 408 and the representation of the vehicle 130 in the vehicle profiles 404. For example, the significant difference can include the representation of the vehicle 130 depicting a midsize vehicle 130 and the images 408 showing a small vehicle 130. The significant difference can include a difference in color, such as the representation showing the vehicle 130 to be black and the images 408 showing the vehicle 130 to be blue. The threshold 414 can be predetermined. The camera manager 206 can include a plurality of thresholds 414, and select the threshold 414 based on a type of the difference 412. For example, the camera manager 206 can determine the difference 412 relates to a model of the vehicle 130, and can select the threshold 414 relating to the model of the vehicle 130. The threshold 414 can be a value (e.g., metric) corresponding to a value of the difference 412. For example, responsive to the difference 412 being an SSIM value, the threshold 414 is an SSIM value. The ML models 222 of the camera manager 206 can be trained by the ML trainers 224 according to the thresholds 414 to determine whether the difference 412 satisfies the threshold 414. The ML model 222 can generate the difference 412 and once generated, compare the difference 412 to the threshold 414 and determine whether the difference 412 satisfies the threshold 414.

The camera manager 206 can determine the identity 416 of each vehicle 130 entering the tunnel 140. The camera manager 206 can determine the identity 416 using the ML models 222, such as a character recognition model. For example, the camera manager 206 can determine the identity 416 from the second images. The camera manager 206 can provide the images 408 to the license plate processor 202 to determine the identity 416 of the vehicle 130. The second images can include the license plate 132 of the vehicle 130, and the license plate processor 202 can determine the license plate information 402 from the second images. The second images can include at least a portion of the vehicle 130 including the license plate 132. The camera manager 206 can determine the identity 416 of the vehicle 130 based on the license plate information 402. In some implementations, the camera manager 206 can determine the identity 416 based on the features 410. For example, the camera manager 206 can determine the features 410 of the vehicle 130 in the second images, and determine the identity 416 by matching the features 410 to features 410 recorded in the vehicle profiles 404. In some implementations, the camera manager 206 can validate (e.g., check, verify) the identity 416 using the features 410. For example, the camera manager 206 determines the identity 416 based on the license plate information 402, and verifies the identity 416 by comparing the features 410 with the features 410 of the vehicle profile 404 associated with the license plate information 402.

Based on the identity 416, the camera manager 206 can update a queue. For example, the camera manager 206 can generate and store a queue based on the vehicles 130 identified in the first images 408. Once the vehicle 130 is detected in the second images 408, the camera manager 206 can compare an order of the vehicles 130 in the second images 408 to the order generates based on the first images 408. The camera manager 206 can update the queue according to any differences between the second images 408 and the queue. For example, responsive to a next vehicle 130 entering the car wash tunnel system 105 being different from a first vehicle 130 in a first position of the queue, the camera manager 206 can rearrange the queue accordingly. The camera manger 206 can include the M L model 222 to update the queue. The ML model 222 can determine difference between the second images 408 and the queue, and update the queue based on any differences.

The license plate processor 202 can include any combination of hardware and software to process, identify or determine license plate information 402. The license plate information 402 can include, receive or capture a license plate number (e.g., sequence of characters) and registration of the license plate 132 of the vehicle 130. The license plate processor 202 can receive the images 408 from the camera manager 206 to process and determine the license plate information 402. The license plate processor 202 can include the one or more ML models 222 including at least one of one or more character recognition models, algorithms, or software, such as optical character recognition (OCR) functions to determine or identify the license plate information 402 from the images 408. For example, the license plate processor 202 inputs the images 408 into the ML model 222, and the ML model 222 outputs the license plate information 402 or identified or listed characteristics of the vehicle. The license plate processor 202 can transform the license plate information 402 on the license plate 132 in the image 408 into computer-readable license plate information 402.

The license plate information 402 can include any data for identify or recognizing a license plate 132 of a vehicle 130. The license plate information 402 can include characters (e.g., letters and numbers) uniquely identifying the license plate number of a vehicle 130. The license plate information 402 can include information about the state or country of the license plate 132. The license plate information 402 can include a classification or a category of a license plate 132, such as a dealer's plate, a military veteran plate, a senior citizen plate or any other characteristic of a license plate. For example, the license plate processor 202 can provide the images 408 as an input to the M L models 222 and receive the license plate information 402. The classification or category of the license plate 132 can be determined by an image classification model.

In some implementations, the license plate processor 202 can determine the license plate information 402 by changing characters on the license plate number. For example, the license plate 132 can be dirty or deformed, making it difficult to determine the license plate information 402. In these cases, the license plate processor 202 can associate and substitute replaceable license plate characters, such as an "O" with a "0" to process and determine the license plate information 402. The license plate processor 202 can include one or more lookup tables that associate replaceable license plate characters with characters to replace the replaceable license plate characters with. The lookup table can include associating, for example, "5" and "S" and "A" and "4." The license plate processor 202 substituting characters can increase an efficiency in identifying the license plate information 402 and a corresponding vehicle profile 404. As such, the license plate information 402 can be different than a license plate number on the license plate 132 of the vehicle 130. In some implementation, instead of, or in conjunction with, generating the replacement character sequence, the license plate processor 202 can utilize information stored in the vehicle profile 404 to identify a vehicle 130 (e.g., within the region of interest 135). For example, the license plate processor 202 can receive the original character sequence from the license plate processor 202, and compare the original character sequence to the license plate data 402 stored in the vehicle profiles 404. Upon determining that the original character sequence is different from each license plate number (e.g., license plate character sequence) in the license plate data 402, the license plate processor 202 can shorten the original character sequence. For example, a last character in the original character sequence can be removed such that a length of the original character sequence is adjusted from 6 characters to 5 characters. The license plate processor 202 can compare the shortened original character sequence with the license plate data 402. The license plate processor 202 can include and utilize a character sequence length threshold. The character sequence length threshold can indicate a minimum length of the shortened original character sequence, such as 4. For example, if the license plate processor 202 shortens the shortened original character sequence to 4 and the shortened original character sequence remains different from the license plate data 402, the license plate processor 202 compares the original character sequence to the character replacement schema of the license plate processor 202 to identify the vehicle 130.

In some implementations, the original character sequence matches the license plate number in one vehicle profile 404. In such cases, the license plate processor 202 can determine that the one vehicle profile 404 corresponds to the vehicle 130. For instance, license plate recognition system can utilize a positional search methodology. This can include configuring a positional search with a minimum starting sequence, such as four characters, to improve the accuracy of license plate matches. For instance, when a camera scans a plate with the value "ABC123," the system can first check the database for an exact match. If no exact match is found, the system can perform positional searches by progressively reducing the number of characters, starting with "ABC12", then "BC12" and so on. This reduction of characters can allow the system to identify potential matches even when the exact plate number is not available, thereby increasing the recognition and decreasing the chance of false negatives.

The positional searching can incorporate utilization, processing and evaluation of metadata to further refine the search results and improve the reliability of the recognitions. Metadata utilized can include, for example, plate region, vehicle color, make, model, and type, each of which can be considered during the search process and determining of the vehicle identity. For example, if the initial search for "ABC123" returns no results, the system can perform a positional search for "ABC12," which may yield several results. These results can be ranked based on the metadata, with higher weight given to matches in the plate region, followed by vehicle color, make, and type. This ranking technique can allow for the most relevant matches to be prioritized, improving the overall accuracy and reliability of the license plate recognition system.

For example, a camera can scan a plate with the value "ABC123" in the region VA, and the vehicle can be a white Chevrolet Silverado pickup. The system can perform a search for license plate data using the initial search for "ABC123", resulting in no results. In response to receiving no results, the data processing system can then proceed to implement a positional search using a portion of the license plate (e.g., subset of the characters) as the input. In such a step, the data processing system can determine that for "ABC12" there may be several matches, including "ABC12E", "ABC125", and "ABC122" of the same state or country. The data processing system can then have each of these matches ranked based on the metadata corresponding to the vehicle data of each of these license plates. For instance, "ABC12E" can receive the highest score due to matching the region (e.g., state), make, color, and vehicle type, thereby being identified as the most likely result. This refined search process can improve the system's ability to accurately recognize license plates, even in cases where the exact plate number is not available.

In another example, upon determining that the shortened original character sequence is the same as at least one license plate number in the license plate data 402, the license plate processor 202 receives the vehicle characteristic 418 from the camera manager 206 based on the images 408. The vehicle characteristic 418 can include at least one of a region of the license plate 132 (e.g., state), color, make, model, or type (e.g., metadata) of the vehicle 130. Once received, the license plate processor 202 can compare the vehicle characteristic 418 to at least one of the license plate data 402 and the vehicle data 406 stored in the vehicle profiles 404. For example, the license plate processor 202 compares the region of the license plate 132 of the vehicle 130 in the images 408 to regions in the license plate data 402 to identify the vehicle profile 404 associated with the vehicle 130. The license plate processor 202 compares the vehicle characteristic 418 to data stored in the vehicle profiles 404 with the vehicle profiles 404 matching the shortened original character sequence. The license plate processor 202 can include weights with the vehicle characteristic 418 for comparing the vehicle 130 to the vehicle profiles 404. For example, a weight of the region of the license plate 132 can be higher than a weight of the color, make, model, or type. The license plate processor 202 identifies a match percentage between the vehicle characteristic 418 and the vehicle profiles 404, and determines the vehicle profile 404 corresponding to the vehicle 130 based on a highest match percentage. For example, the license plate processor 202 or the camera manager 206 determines a difference between each of the region, make, model, color, and type of the vehicle 130 with the region, make, model, color, and type of vehicle stored in each of the vehicle profiles 404, weighs the differences, and determines the match percentage for each of the vehicle profiles 404 with the vehicle 130 based on the weighted difference.

The profile manager 204 can operate with the car wash service manager 208 to identify a type of car wash service to be performed on the vehicle using the license plate information 402 and characteristics or features 410 of the profile of the identified vehicle 130. The profile manager 204 can store and provide various vehicle profiles 404. A vehicle profile 404 can include various vehicle data 406. For example, the vehicle data 406 can include license plate data such as the license plate number. The vehicle data 406 can include features of the vehicle 130 (e.g., features 410), a type of car wash service, a make and a model of the vehicle 130, and a representation of a body of the vehicle 130, such as an illustration or an image. The representation of the body of the vehicle 130 can be at least one of an illustration, image of the vehicle 130, or a model, such as a 3D representation of the vehicle 130. Vehicle profile 404 can include a service history including information on types of services provided to the vehicle at the facility 100, such as the type of car wash, or types of settings or adjustments made to the service provided. Each of the vehicle profiles 404 can be tagged (e.g., marked, associated) with the license plate information 402.

Vehicle data 406 can include indications of configurations added to the vehicle, such as a roof rack, a spoiler or any other feature or component added to, or installed onto, the vehicle 130. For example, the vehicle data 406 can include license plate data that corresponds to the license plate information 402. The profile manager 204 can determine and extract vehicle profiles 404 based on the license plate information 402 provided by the license plate processor 202. For example, the profile manager 204 can match the license plate information 402 to the vehicle data 406. Each of the vehicle profiles 404 can include at least one data structure. The data structures can include one or more entries. At least one entry can be for receiving input of vehicles features (e.g., features 410). Vehicle data 406 can include car wash history listing dates and services provided to the vehicle, including a service type or service configuration (e.g., service requests 418 and routines 420 applied to provide services to the same vehicles during prior visits).

The profile manager 204 can include ML models 222 to extract vehicle profiles 404 based on the license plate information 402. In some implementations, the profile manager 204 can receive a query and input the query into the ML model 222. The query can include one or more images 408 of a vehicle 130 or vehicle features 410 or license plate information extracted from one or more images. The ML model 222 can output the vehicle profile 404 based on the query, and can highlight relevant sections of the vehicle profile 404 according to the query. In some implementations, the M L model 222 generates a response to the query based on the vehicle profiles 404. The response can include vehicle data 406 from the vehicle profile 404 corresponding to the identified vehicle, including vehicle features, history of car wash services or prior visits and user information.

The profile manager 204 can provide functionality to automatically populate notes or information based on the service history of the vehicle. For example, responsive to identifying a vehicle profile 404 of a vehicle 130, the profile manager 204 can identify prior vehicles services provided to the vehicle. The profile manager 204 can auto-populate a favorite or preferred service request 418, such as a most recently utilized service request 418 or a most commonly utilized service request for a particular type of service for the vehicle. For example, the profile manager 204 can auto-populate one or more routines 420 and instructions 422 for providing a customized service for the vehicle 130 based on vehicle features 410 (e.g., vehicle body type, added components, particular paint applied to the vehicle or any characteristic).

Profile manager 204 can utilize images 408 to identify or confirm that the configuration of the vehicle 130 remains the same as with the previous service. For instance, the profile manager 204 can utilize a camera manager 206 to compare current images 408 with prior images 408. In response to determining that no changes to the vehicle features are detected, the profile manager 204 can auto-populate the vehicle information (e.g., prior service request 418, routine 420 or instructions 422) to prompt or suggest the same service as provided during a prior visit. In response to determining that there changes to the vehicle features between the current visit and the prior visit (e.g., based on identified differences 412 exceeding a threshold 414 between the current and prior images 408), the profile manager 204 or the car wash manager 208 can issue a new service request 418, routine 420 and instructions 422.

The car wash service manager 208 can identify a type of car wash service to be performed on the vehicle 130. Responsive to the profile manager 204 determining the vehicle profile 404 of the vehicle 130 based on the license plate information 402 or features 410 determined from images 408, the car wash service manager 208 can determine the type of car wash service from the vehicle profile 404. The car wash service manager 208 can include the ML models 222 to extract the type of car wash service from the vehicle profile 404, and the ML models 222 can be trained by ML trainers 224 on sample vehicle profiles to identify the type of car wash service. For example, the vehicle data 406 can include the type of car wash service. The type of car wash service can be preset and based on a subscription of the vehicle 130 as indicated in the vehicle profile 404. The type of car wash service can include at least one of "Express wash," "Platinum wash," "Silver wash," etc. For example, the type of car wash service can include multiple levels of car washes including express wash, platinum wash, and silver wash. Each level of the type of car wash service can include a different type or number of services. For example, the platinum wash can include a wheel polish, an underbody rinse, and a wax service while the express service includes a cleansing foam and a rinse.

Based on the type of car wash service, the car wash service manager 208 can generate the car wash service request 418. The car wash service request 418 can include the license plate information 402 of the vehicle 130, the features 410, and the type of car wash service to be performed on the vehicle 130. The car wash service manager 208 can include M L models 222 to generate the car wash service request 418. The car wash service manager 208 can tag (e.g., associate) the car wash service request 418 with the license plate information 402. The car wash service manager 208 can include at least one of a log or database to store the car wash service request 418. The car wash service manager 208 can store the association along with the car wash service request 418. In some implementations, the car wash service manager 208 can arrange the car wash service requests 418 based on an order of the vehicles 130 at the service facility 100 as shown in the images 408.

The car wash service manager 208 can selectively control deployment of car wash actuation components based on the features 410. The car wash tunnel system 105 can include the car wash actuation components. The car wash actuation components can include the service equipment 110. The car wash actuation components can include at least one of a component to control application of one or more fluids onto the vehicle 130 during the car wash routine 420 (e.g., resource dispensers 114) or a component to control application of physical contact of a material (e.g., brush, roller) onto a surface of the vehicle 130 during the car wash routine 420 (e.g., car wash machines 112). For example, the car wash service manager 208 can, responsive to the features 410 including features 410 installed on the roof of the vehicle 130, identify at least one actuation component configured to clean the roof of the vehicle 130. Such actuation components can include overhead brushes or overhead rollers. Once identified, the car wash service manager 208 can include in the car wash service request 418 to selectively control deployment of the actuation component based on the features 410 on the roof of the vehicle 130. For example, the car wash service request 418 can indicate to not deploy the actuation component. As another example, the car wash service request 418 can indicate to deploy the actuation component on certain parts of the roof of the vehicle 130. The certain parts can be locations on the roof of the vehicle 130 that does not include the feature 410. The car wash service request 418 can indicate to deploy the actuation component according to a height of the vehicle 130 including the component on the roof.

The car wash service manager 208 can include ML models 222 to indicate which actuation components to deploy. The ML models 222 can be trained by the ML trainers 224 on different types of car washes and vehicles 130 with different features 410 to determine which actuation components to deploy. The ML models 222 can receive the vehicle 130, the type of car wash, and the features 410 as an input and output which of the actuation components or resources (e.g., soaps, polishes or other service fluids or materials) to deploy.

The car wash service manager 208 can generate the car wash service request 418 to selectively control deployment of the actuation components or resources based on at least one of a make or model of the vehicle 130. The make and model of the vehicle 130 can be identified by at least one of the images 408 or the vehicle profile 404. For example, the make and model of the vehicle 130 can indicate the size, dimensions, type of paint, etc. Using this information, the car wash service manager 208 can generate the car wash service request 418 to indicate deployment of the actuation components based on at least one of the make or model. The car wash manager 208 can generate the car wash service request 418 to request usage of a particular resource, such as a particular type of soap, a particular amount or pressure of water, a particular type of car wash polish.

The car wash routine 420 can specify a distance at which to deploy each of the actuation components according to a height and width of the vehicle 130. As another example, at least one of the make or model can identify the type of paint, such as metallic gray, and the car wash routine 420 can include which car wash soap solution to used based on the type of paint. In some implementations, the car wash service manager 208 can include a database associating each type of paint with at least one car wash soap solution. For example, responsive to the paint of the vehicle 130 including pearlescent paint, the car wash service manager 208 can generate the car wash service request 418 to indicate a pH-neutral car wash soap solution.

The car wash service manager 208 can maintain a queue of vehicles 130 based on an order of the car wash service requests 418 identifying vehicles 130 in the order in which they are to enter the tunnel 140. For example, the car wash service manager 208 generates a first car wash service request 418 in response to identifying a type of car wash service from the one or more first images 408 and places the first car wash service request 418 in a first position of the queue of vehicles 130. The car wash service manager 208 can continue placing the car wash service requests 418 in the queue as the car wash service manager 208 generates car wash service requests 418. Upon identification of the identity 416 by the camera manager 206 in the second images 408, the camera manager 206 can determine discrepancies between the queue of vehicles 130 in the images 408 and a stored queue, and transmit a queue update to the car wash service manager 208. The camera manger 206 can include the ML model 222 to determine the discrepancies. The car wash service manager 208 can rearrange the queue of car wash service requests 418 according to the queue update to ensure that each vehicle 130 is provided with the appropriate service.

After determining the identity 416 of the vehicle 130 entering into the car wash tunnel system 105, the car wash service manager 208 can generate the car wash routine 420 using the car wash service request 418. The car wash routine 420 can instruct, command or specify type of actuation, service, control or resources (e.g., soap type or water amount) to be applied. For example, the identity 416 can include the license plate information 402, and the car wash service manager 208 can receive the identity 416 from the camera manager 206 and identify the car wash service request 418 using the vehicle profile 404 associated with the license plate information 402. The car wash service request 418 can indicate services to include in the car wash routine 420. For example, responsive to the car wash service request 418 including the platinum wash, the car wash routine 420 can include the wheel polish, the underbody rinse, and the wax service. The car wash service manager 208 can include the ML model 222 to generate car wash routines 420 from the car wash service requests 418. The car wash routine 420 can indicate an order of services and a length of time of each service. The car wash routine 420 can select which actuation components (e.g., a subset of the actuation components) of the car wash tunnel system 105 to use to perform the car wash on the vehicle 130 based on the car wash service request 418. The car wash routine 420 can include controlling deployment of certain car wash soap solutions based on the paint of the vehicle 130 (e.g., type of paint of the vehicle 130). The paint of the vehicle 130 can be included in the features 410 of the car wash service request 418, and the car wash service manager 208 can generate the car wash routine 420 based at least partially on the paint.

The car wash routine 420 can include deploying a first actuation component of the one or more car wash actuation components during a first portion of the car wash routine 420 and restricting deployment of a second actuation component during a second portion of the car wash routine 420. For example, the car wash service request 418 can indicate that the vehicle 130 includes a bike rack installed on a back of the vehicle 130. The car wash service manager 208 can generate the car wash routine 420 to deploy, for example, a car wash machine 112 on a front of the vehicle 130 during the first portion of the car wash routine 420 and restrict deployment of the car wash machine 112 on the back of the vehicle 130 during the second portion of the car wash routine 420. The car wash machine 112 can be fixed to a portion of the tunnel 140, and the vehicle 130 can travel through a location of the car wash machine. In some implementations, the first portion of the car wash routine 420 includes underbody brush rollers and the second portion includes overhead brush rollers. The underbody brush rollers can utilize a particular type of liquid (e.g., soap or anti-corrosion material) to be applied, based on the type of paint or material of the vehicle. In such configurations, responsive to the car wash service request 418 indicating the features 410 installed on the roof of the vehicle 130, the car wash routine 420 can deploy the underbody brush rollers and restrict deployment of the overhead brush rollers.

Responsive to generating the car wash routine 420, the car wash service manager 208 can transmit instructions 422 to the car wash controller 104 to execute the car wash routine 420. The car wash controller 104 can be communicatively coupled to the gate cameras 120, the tunnel camera 122, a database storing the type of car wash service, and the car wash tunnel system 105. For example, the car wash controller 104 can transmit instructions to capture the images 408 to the gate cameras 120 and the tunnel camera 122. The instructions 422 can include the car wash routine 420. The instructions 422 can cause the car wash controller 104 to instruct the car wash tunnel system 105 to selectively control deployment of one or more car wash actuation components (e.g., service equipment 110) according to the car wash routine 420. For example, the car wash routine 420 can indicate that the vehicle 130 includes features 410 on a roof of the vehicle 130. As such, the car wash controller 104 can selectively deploy the service equipment 110 of the car wash tunnel system 105 such that the car wash tunnel system 105 does not, for example, use brush rollers on the roof of the vehicle 130. In some implementations, the car wash routine 420 indicates which of the service equipment 110 to deploy, and the car wash controller 104 selective deploys the service equipment 110 according to the indication. The car wash controller 104 can control a distance at which the actuation components are deployed to contact the vehicle 130 as well as which actuation components to deploy based on the car wash routine 420. As another example, the car wash controller 104 can selectively deploy the resource dispenser 114 including the car wash soap solution indicated in the car wash routine 420.

The car wash controller 104 can extract a type of car wash from the database storing the type of car wash service based on the car wash routine 420. The database can include each of the types of car wash service, such as the "express wash," "platinum wash," and "silver wash." The car wash controller 104 can adjust the type of car wash and the selectively deployment of actuation components indicated by the car wash routine 420. For example, the type of car wash can correspond to a type of routine, and the car wash controller 104 can adjust the type of routine according to the car wash routine 420. The car wash controller 104 can select the car wash soap solution to use on the vehicle 130 according to the car wash soap solution identified in the car wash routine 420.

The GUI manager 212 can generate and provide various data to the GUI 250 of at least one operator device 150. For example, responsive to the camera manager 206 determining that the difference 412 satisfies the threshold 414, the GUI manager 212 can generate a notification to display on a device (e.g., the operator device 150) to indicate that the body of the vehicle 130 differs from the representation stored in the vehicle profile 404. The notification can include an alert that the vehicle 130 has sustained damage since a prior update to the vehicle profile 404. For example, the vehicle 130 can include a dent in a rear bumper that was not present in the representation stored in the vehicle profile 404. The car wash service manager 208 can generate the car wash service request 418 according to updates to the representation in the vehicle profile 404. The representation in the vehicle profile 404 can be updated responsive to the difference 412 satisfying the threshold 414. The representation in the vehicle profile 404 can be updated to match the vehicle 130 shown in the images 408. As such, the camera manager 206 can compare the images 408 to an updated representation of the vehicle 130 to determine the difference 412.

Data processing system 118 can include the functionality for utilizing QR codes 166 to allow for vehicle identification, verification, and user selection and customization of vehicle services. For example, upon driving up to a lane 134 or a gate 160 of a facility 100, a user (e.g., a driver) can scan the QR code 166 using their smartphone. The QR code 166 can be positioned at any location at the facility 100, including on, adjacent to, or along a lane 134, a gate 160, entrance to a tunnel 140 or car wash tunnel system 105. Upon scanning, the QR code 166 can direct the smartphone of the user to a webpage where the user can select from a variety of car wash services of the facility 100, including a basic wash, a premium wash, or a special polishing service. The user can also choose to upgrade their service type from a one-time wash to a monthly or annual subscription. The webpage or the application provided via the QR code 166 can allow the user to configure specific preferences associated with the vehicle profile 404 or vehicle data 406, such as opting for a tire shine or an underbody wash. Once the user has made their selections, the data processing system 118 can process the request and update the user's profile with the chosen services, ensuring that the car wash tunnel system 105 is prepared to provide the selected services when the vehicle enters the tunnel 140.

The QR code 166 can be used in conjunction with a license plate processor 202 to enhance security and personalization of services. For instance, when the user scans the QR code 166, the data processing system 118 can verify the user's identity by matching the data (e.g., identifier) of the smartphone that scanned the QR code with the license plate data captured by the license plate processor 202. The identifier can include, for example, the phone's unique device ID, the user's account information, or a session token generated by the application. This verification process can validate the smartphone with the recognized license plate data to ensure that the services are provided to the correct vehicle and user. For instance, if the license plate processor 202 recognizes the license plate of the vehicle and matches it with the phone identifier, the data processing system 118 can grant access to the user's profile or account, allowing them to manage their services and preferences. This feature can provide an additional layer of security and personalization, ensuring that the services are tailored to the specific needs and preferences of the user.

For example, the feature can be implemented by positioning a QR code 166 next to a gate 160, where a user can scan the QR code 166 with their smartphone. For example, the feature can be implemented by positioning a QR code 166 next to a gate 160, where a user can scan the QR code 166 using their smartphone. The data processing system 118 can then allow the user to continue following the prompts from the link provided via the QR code to authenticate the user. Once authenticated, the smartphone of the user can be assigned an identifier for the smartphone. This identifier can be used to verify the user's identity. For instance, the system can match the phone identifier received via the smartphone using the QR code 166 with the license plate data captured by the license plate processor 202. Upon successful verification, the data processing system 118 can grant access to the user's profile, allowing them to select and configure car wash services, change their service type, and update their preferences. The car wash tunnel system 105 can then be prepared to provide the selected services when the vehicle enters the tunnel, ensuring a personalized and efficient car wash experience.

Data processing system 118 can be configured to utilize Bluetooth beacons, other wireless beacons, or transponder devices to identify users and vehicles within the facility 100. Car beacons can be installed in vehicles and can transmit a unique identifier (e.g., unique vehicle identifier) that can be detected by the facility's beacon receivers or reader devices. When a vehicle equipped with a car beacon or transponder device enters the facility 100 (e.g., premises or a car wash building), the beacon receiver or reader device can capture the unique identifier and transmit it to the data processing system 118. The data processing system 118 can then match the unique identifier with the vehicle profile 404 or vehicle data 412 stored in the system, allowing for seamless identification and verification of the vehicle. In response to the identification and verification, the system can allow the user to access vehicle data or client account and make changes, such as service configures or service selections for the vehicle. This can allow the system to provide personalized services and streamline the user experience by automatically recognizing the vehicle and its associated preferences.

The transponder devices can include at least one radio-frequency identification (RFID) tag which includes the unique identifier. The reader device can emit radio signals, and the RFID tag can receive the radio signals and return the unique identifier. The reader device can capture the unique identifier and transmit the unique identifier to the data processing system to identify and verify the vehicle. As with other transponder device examples, the RFID tags can be utilized to uniquely identify a user or the vehicle and can be used in combination with other techniques (e.g., license plate recognition or QR code scanning) to validate identification of the user and provide access to user data and service control functionalities.

For instance, phone beacons, transponders or RFID tags can be used to identify users based on the unique identifier or signal transmitted by their smartphones. For instance, a phone beacon can be any wireless device that transmits a unique identifier from a smartphone, allowing the data processing system 118 to detect and identify the user based on the transmitted identifier. When a user with a phone beacon-enabled smartphone, or an RFID tag, enters the facility, the beacon receiver or reader device can detect the unique identifier and send it to the data processing system 118. The data processing system 118 can match the unique identifier with the user's profile or account information, allowing for personalized service customization and verification. For example, the system can grant access to the user's profile, enabling them to select and configure car wash services, change their service type, and update their preferences. This integration of phone beacons can improve security and personalization, providing for services that the users can tailor to their specific needs and preferences.

For example, the feature can be implemented by installing car beacons or transponder devices in vehicles and configuring the data processing system 118 to detect the unique identifier transmitted by the car beacon or transponder device (e.g., RFID tag) when the vehicle enters the facility. The beacon receiver or reader device can capture the unique identifier and transmit it to the data processing system 118, which can then match the identifier with the vehicle profile 404 or vehicle data 406. Upon successful identification, the data processing system 118 can grant access to the user's profile, allowing them to select and configure car wash services, change their service type, and update their preferences. The car wash tunnel system 105 can then be prepared to provide the selected services when the vehicle enters the tunnel, ensuring a personalized and efficient car wash experience.

The car beacon or transponder devices (e.g., RFID tags) can be used in conjunction with a license plate processor 202 or QR codes 166 to enhance security and personalization of services. For instance, when a radio signal (e.g., beacon signal) from a car beacon or transponder device indicates or identifies a particular vehicle or a user associated with a vehicle, the data processing system 118 can verify or validate the user's identity by matching the data of the radio signal with a license plate data determined by a license plate processor 202 or a scanned the QR code. The data of the radio or beacon signal can include signal information or code uniquely identifying a vehicle or user of the vehicle, which can be matched with QR code data or license plate data to validate or verify the identification. This verification process can improve the security of the system and ensure that the services are provided to the correct vehicle and user. For instance, if the license plate processor 202 recognizes the license plate of the vehicle and matches it with the beacon signal, the data processing system 118 can grant access to the user's profile or account, allowing them to manage their services and preferences.

Figure 5:
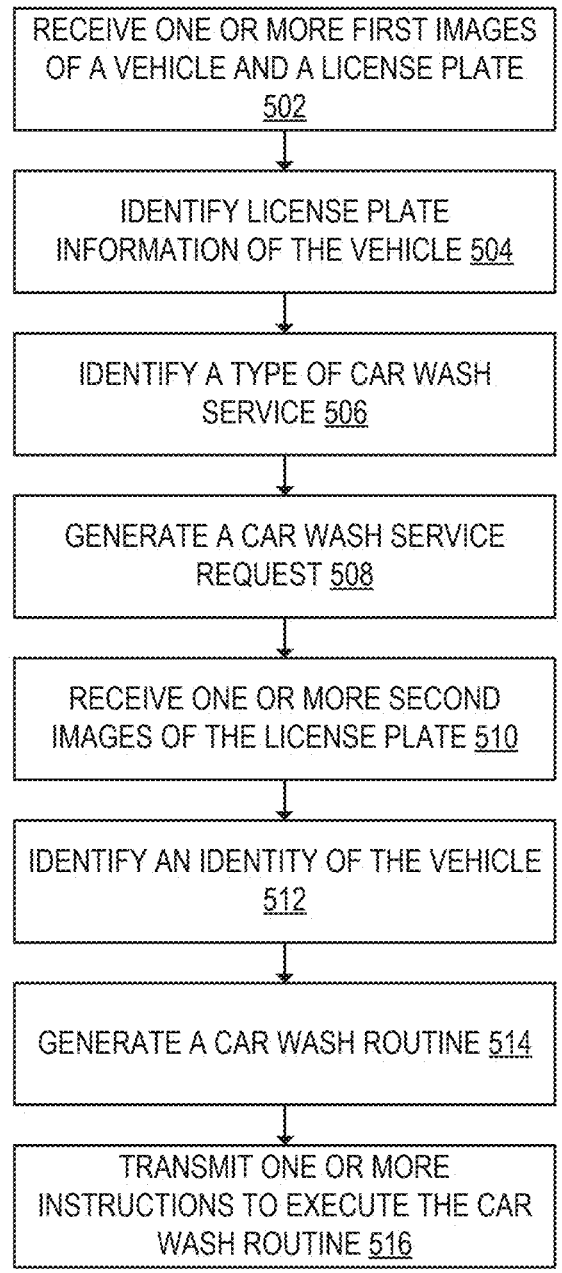
FIG. 5 is an example flow diagram of a method for automated control of actuation components in car wash facilities.

FIG. 5 is an example method 500 for implementing at least one of the systems 200, 300, or 400 as described above. For instance, the example method 500 can be implemented using one or more processors (e.g., 310) executing instructions or data stored in one or more memories (e.g., 315, 320 or 325) of a computing device or an environment. The method 500 can include acts or operations indicated by blocks 502-516, which can be performed in any order or out of order illustrated in FIG. 5. For instance, depending on implementation, any of the acts corresponding to blocks 502-516 can be performed multiple times, omitted or performed in any order.

At block 502, the method 500 can include receiving one or more first images of a vehicle and a license plate. The one or more first images can be received and captured by a first image capture device while the vehicle is at a first region of a service facility including a car wash system. The first region of the service facility can be between an entrance and a gate of the service facility. The first one or more images can be images of one or more lanes leading into a lane to enter a facility or a tunnel of the facility. The first image capture device can be positioned at the first region to capture the first images of one or more vehicles approaching a facility or car wash system. The data processing system can receive the one or more first images from one or more first image capture devices, such as cameras at one or more lanes of the facility area.

The one or more first images can be continually received from the first image capture device. For instance, the one or more images can be captured periodically (e.g., thirty or sixty frames per second, ten frames per second, every second, or every five or ten seconds). The first image capture device can provide the one or more first images to be received in response to, for example, a transmitted signal. The one or more first images can include at least license plate information and features of the vehicle, such as a license plate number or a make and model of the vehicle. At least a portion of the vehicle can be captured (e.g., included) in the one or more first images.

At block 504, the method 500 can include identifying license plate information of the vehicle and one or more vehicle features of the vehicle. The data processing system can identify the license plate information and the vehicle features from the one or more first images. The license plate information can include a license plate number of the vehicle. At least one ML model can be used to identify the license plate information from the one or more first images, such as an image and character recognition model. The ML model can substitute characters in the image, such as "A" to "4," to determine the license plate information. The vehicle features can include at least one of a physical object attached to the vehicle or a characteristic of the vehicle, wherein the characteristic of the vehicle comprises at least one of: a color of vehicle, a shape of the vehicle, a size of the vehicle, or a vehicle dimension.

In some implementations, the method 500 can include determining that the one or more vehicle features are installed on a roof of the vehicle. Responsive to the determination, an actuation components of the one or more car wash actuation components configured to clean the roof of the vehicle can be identified. Once identified, the method

500 can include the data processing system selectively controlling deployment of the actuation component based on the one or more vehicle features on the roof of the vehicle. The method 500 can include identifying a data structure of a vehicle profile comprising an entry for vehicle features and storing, into the data structure of the vehicle profile, information on the one or more vehicle features. The method 500 can include identifying one or more vehicle features corresponding to a paint of the vehicle and at least one of a make or model of the vehicle.

At block 506, the method 500 can include identifying a type of car wash service to be performed on the vehicle. The type of car wash service can be stored in a vehicle profile of the vehicle. The data processing system can identify the vehicle profile using the license plate information of the vehicle. Types of car wash services can be stored in a database, and the type of car wash service can be identified based on, for example, the features of the vehicle. The type of car wash service can include a name of the service, such as "silver wash" or "platinum wash."

The type of car wash service can identify a number and type of services to be provided to the vehicle. For example, the type of car wash service can indicate to provide the vehicle with a tire shine, a cleansing foam, and an underbody rinsing. The type of car wash service can be associated with a subscription of the vehicle profile. For example, according to the vehicle profile, the vehicle corresponds to a subscription for a number of car wash services of the type of car wash service.

At block 508, the method 500 can include generating a car wash service request. The car wash service request can include the license plate information of the vehicle, the one or more vehicle features of the vehicle, and the type of car wash service to be performed on the vehicle. The car wash service request can correspond to the vehicle profile of the vehicle. In some implementations, the car wash service request includes an indication of a position of the vehicle in a queue to the car wash system. For example, the vehicle can be included in a plurality of vehicles waiting to enter the car wash system.

The car wash service request can indicate, for example, an order of the number and type of services to provide to the vehicle. The car wash service request can identify the vehicle features, and adjust the type of car wash service. For example, after identifying the type of car wash service, the car wash service request can be generated to accommodate for vehicle features, such as components installed on a roof of the vehicle. The car wash service request can indicate a type of soap to use during the car wash service based on, for example, the paint of the vehicle as identified in the vehicle features.

At block 510, the method 500 can include receiving one or more second image of the license plate of the vehicle. The second images can be received by a second image capture device. The second images can be received while the vehicle is at a second region of the service facility. The second region can be between the gate and a tunnel of the service facility. The one or more second images can be captured at the second region of the service facility at a second time interval subsequent to a first time interval during which the one or more first images were captured at the first region of the service facility. The vehicle can be captured in both the first images and the second images as the vehicle moves through the service facility. The one or more second images can include the license plate of the vehicle and the identity of the vehicle can be determined based on extracted license plate information from the one or more second images. The method 500 can include determining discrepancies between an order of the vehicles in the second images and an order of the vehicles in a stored queue of car wash service requests. An ML model can be used to determine the discrepancies and any updates responsive to determining at least one discrepancy. The stored queue can indicate an order of the vehicles in the service facility. Positions of the vehicles in the stored queue can be updated according to the discrepancies.

In some implementations, the data processing system can identify a difference between a body of the vehicle and a representation of the body of the vehicle stored in a vehicle profile of the vehicle based on the one or more first images or the one or more second images. The data processing system can determine the difference to satisfy a threshold for a significant threshold and the method 500 can include generating a notification to display on a device to indicate that the body of the vehicle differs from the stored representation of the body of the vehicle profile. The notification can include an alert to indicate that the vehicle had sustained damage since a prior update to the vehicle profile. Responsive to the difference satisfying the threshold, the representation of the body of the vehicle in the vehicle profile can be updated.

At block 512, the method 500 can include identifying an identity of the vehicle entering into the car wash. The identity of the vehicle can be identified from the one or more second images. The identity can be identified based on the license plate information extracted from the one or more second images. The identity can be used to identify the car wash service request associated with the vehicle. The second image capture device can be positioned at an entrance of the car wash (e.g., tunnel). At least one M L model can be used to identify the identity of the vehicle, such as an image recognition model.

In some implementations, the data processing system can identify or validate the identity of the vehicle based on the vehicle features. For example, the vehicle features can be identified in the one or more second images such as the size, dimensions, make, model, and color of the vehicle. In some implementations, the identity of the vehicle can be identified using the license plate information and verified using the vehicle features. The vehicle features of the vehicle can be identified and compared with the features stored in the vehicle profile corresponding to the license plate information.

At block 514, the method 500 can include generating a car wash routine using the car wash service request. Since the car wash service request includes the features, the license plate information, and the type of car wash service, the car wash routine can be generated based on the type of car wash service and altered based on the features. For example, responsive to the type of Car wash service being a "silver wash," the car wash routine can extract the car wash routine associated with the silver wash from a data base. The car wash routine can be adjusted based on the features. For example, the car wash routine can indicate which car wash soap solution to use based on the paint indicated in the car wash service request.

The car wash routine can include the order of the services and a length of time for each service according to the car wash service request. The car wash routine can select actuation components and soap to use based on the vehicle features. In some implementations, the car wash routine includes at least one service setting based on the car wash service request. The service setting can include, for example, a temperature at which to perform at least one of the services on the vehicle.

At block 516, the method 500 can include transmitting one or more instructions to cause the car wash system to execute the car wash routine. The instructions can be transmitted to a car wash controller. The instructions can cause the car wash system to execute the car wash routine by selectively controlling deployment of one or more car wash actuation components based on the vehicle features. The car wash controller can be communicatively coupled with the first image capture device, the second image capture device, a database storing the type of car wash service, and the car wash system. The one or more car wash actuation components can include a component to control application of one or more fluids onto the vehicle during the car wash routine. The one or more car wash actuation components can include a component to control application of physical contact of a material onto a surface of the vehicle during the car wash routine.

In some implementations, the routine can include deploying a first actuation component of the one or more car wash actuation components during a first portion of the car wash routine and restricting deployment of a second actuation component of the one or more car wash actuation components during a second portion of the car wash routine. The method 500 can include the data processing system selectively controlling deployment of a car wash actuation component for providing a car wash soap solution based on the paint. The method 500 can include providing an instruction to the car wash controller to selectively control deployment of a car wash actuation component of the one or more car wash actuation components, based on at least one of the make or the model.

Figure 6A:
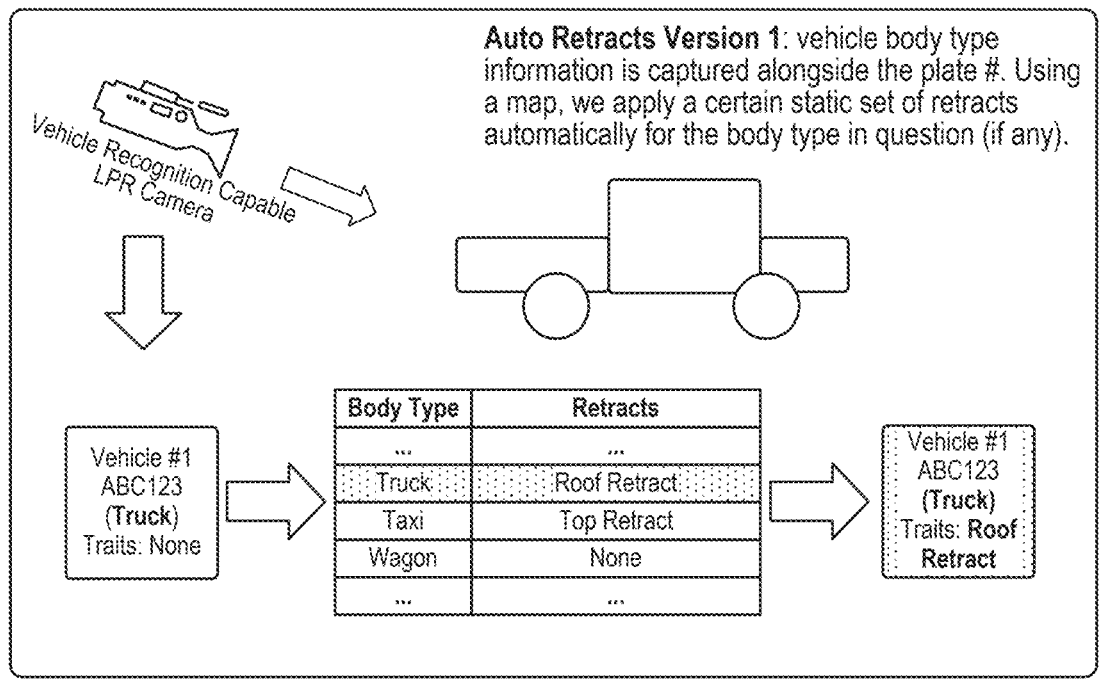
FIGS. 6A-6B are example diagrams of a process and a portion of a vehicle service facility.
Figure 6A:
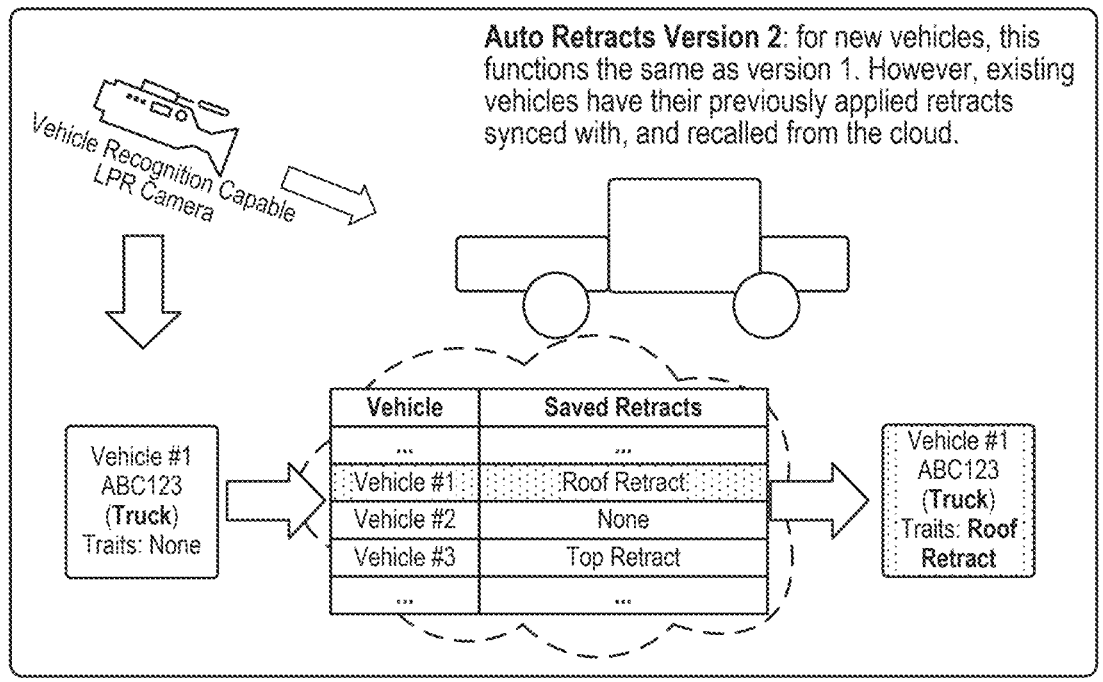
Figure 6B:
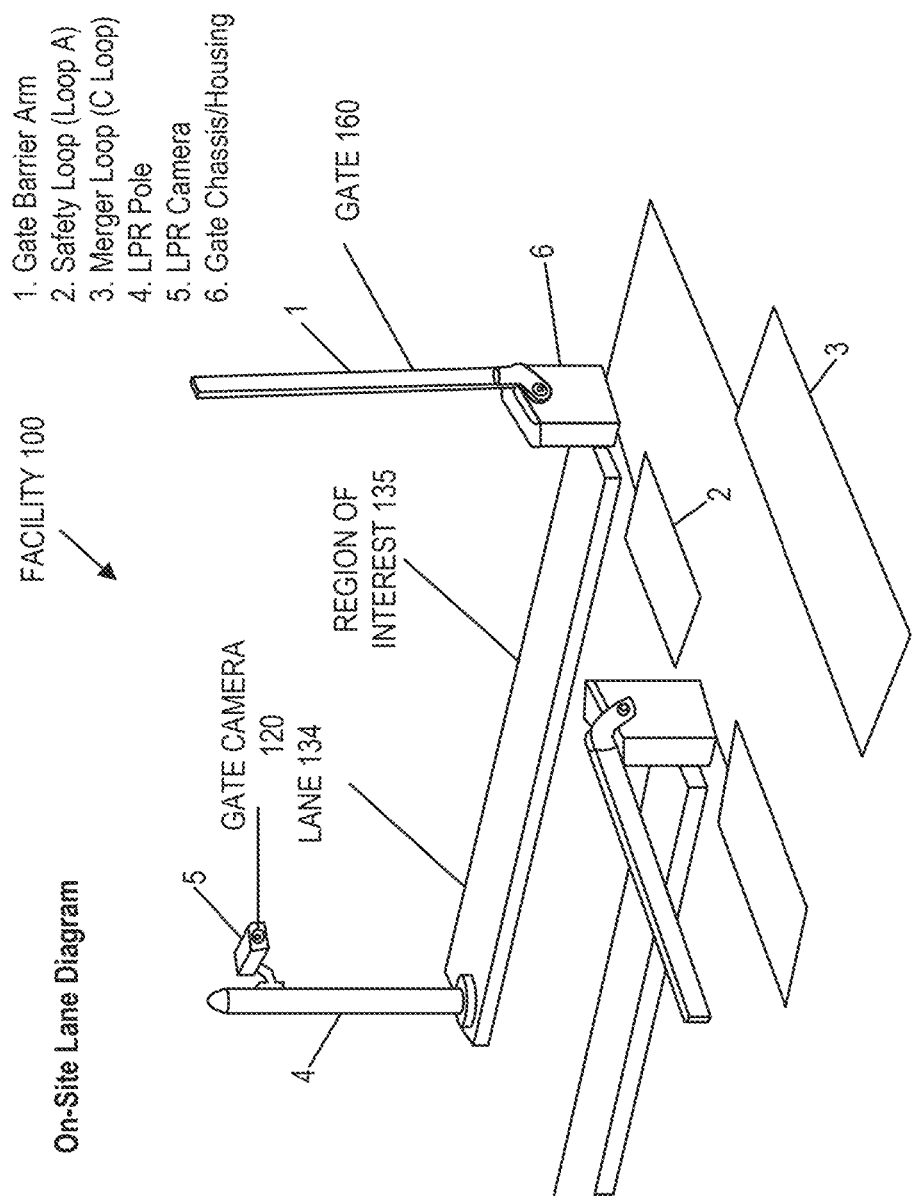

Referring now to FIGS. 6A-B, a process for determining components of a roof of a vehicle. FIG. 6A depicts an example diagram 610 for determining whether the vehicle includes a retract (e.g., indication for a car wash actuation component to retract). At least one image capture device can capture images of the vehicle, and determine a body type of the vehicle, such as a truck, taxi, or wagon. The body type can indicate whether the vehicle includes a retract. For example, the body type being a truck indicates that the truck includes a truck bed which can be a roof retract. As another example, the body type being a taxi indicates a component installed on a roof of the taxi, indicating that the vehicle includes a top retract. The image can be compared with a database of vehicles with corresponding retracts to determine whether the vehicle in the image includes a retract. Upon determining that the vehicle includes a retract, a type of the retract can be included in the vehicle information (e.g., car wash service request, features).

FIG. 6B depicts an example diagram 620 of the facility 100 which can include the gates 160, the region of interest 135, the lane 134, and the gate camera 120. The example diagram 620 can include one or more loops (e.g., safety or merger loops) which can be utilized to facilitate in imaging, detection or identification of a vehicle 130. The gates 160 can include a gate barrier arm and a housing. The gate camera 120 can be mounted onto a pole and face a direction of the gate 160. The one or more images of the vehicle taken to determine whether the vehicle includes the retract can be taken by the gate camera 120 while the vehicle is in the region of interest 135.

The systems described above can provide multiple ones of any or each of those components and these components can be provided on either a standalone system or on multiple instantiations in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language or a script, such as Python, JavaScript, LISP, PERL, C, C++, C#, PROLOG, or JAVA. The software programs or executable instructions can be stored on or in one or more articles of manufacture as object code.

Example and non-limiting module implementation elements can include or use input providing devices, such as touchscreens, computer selection devices (e.g., computer mouse), detectors or sensors that can provide any value determined herein, as well as sensors providing any value that is a precursor to a value determined herein, datalink or network hardware including communication processors, circuits or chips, oscillating crystals, communication links, cables, twisted pair wiring, coaxial wiring, shielded wiring, transmitters, receivers, or transceivers, logic circuits, hardwired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more sets of computer program instructions, encoded on one or more computer storage media for execution by, or to control the operation of, data processing apparatuses. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can be, or be included in, one or more separate components or media (e.g., multiple CDs, disks, or other storage devices including cloud storage). The operations described in this specification can be implemented as operations performed by a data processing apparatus on data stored on one or more computer-readable storage devices or received from other sources.

The terms "computing device," "computing environment," "component" or "data processing apparatus" or the like encompass various apparatuses, devices, and machines for processing data, including by way of example a programmable processor, a memory, a computer, a system on a chip, or multiple ones, or combinations of the foregoing. The apparatus can include special purpose logic circuitry, e.g., an FPGA (field programmable gate array) or an ASIC (application specific integrated circuit). The apparatus can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can be performed by, and apparatuses can be implemented as, special purpose logic circuitry, e.g., an FPGA (field programmable gate array) or an A SIC (application specific integrated circuit). Devices suitable for storing computer program instructions and data can include non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order. Furthermore, the terms "based on" or "responsive to" can imply both direct and indirect relationships, meaning that an action can be directly or indirectly based on or responsive to another action.

Having now described some illustrative implementations, it is apparent that the foregoing is illustrative and not limiting, having been presented by way of example. In particular, although many of the examples presented herein involve specific combinations of method acts or system elements, those acts or operations and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including" "comprising" "having" "contained" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can embrace implementations including a plurality of these elements from any section or paragraph, and any references in plural to any implementation or element or act herein can embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or implementation, and references to "an implementation", "an implementation," "some implementations," "one implementation" or the like are not necessarily mutually exclusive and are intended to indicate that a particular feature, structure, or characteristic described in connection with the implementation may be included in at least one implementation or implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A,' only 'B,' as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

Modifications of described elements and acts such as variations in sizes, dimensions, structures, shapes and proportions of the various elements, values of parameters, mounting arrangements, numbers of inputs or outputs, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can be made in the design, operating conditions and arrangement of the disclosed elements and operations without departing from the scope of the present disclosure.

For example, descriptions of positive and negative electrical characteristics may be reversed. For example, a positive or a negative parameter, input, or difficulty direction with respect to a testing system can be increased or decreased, as desired. Elements described as negative or decreasing in value can instead be configured as positive or increasing in value and vice versa. For example, elements described as having a lower difficulty level can have a higher difficulty level and vice versa. Further relative parameter values described with respect to other values can include variations within +/−10% or +/−10 degrees of a pure stated value, such as with +/−10 degrees of a pure vertical, parallel, or perpendicular positioning or a signal value. References to "approximately," "substantially" or other terms of degree include variations of +/−10% from the given measurement, unit, or range unless explicitly indicated otherwise. Coupled elements can be electrically, communicatively, mechanically, or physically coupled with one another directly or with intervening elements.

While the disclosure has been described with respect to specific implementations, one skilled in the art will recognize that numerous modifications are possible. For instance, although specific examples of rules (including triggering conditions and/or resulting actions) and processes for generating suggested rules are described, other rules and processes can be implemented. Implementations of the disclosure can be realized using a variety of computer systems and communication technologies including but not limited to specific examples described herein.

Implementations of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the implementations described above may make reference to specific hardware and software components, those skilled in the art will appreciate that different combinations of hardware and/or software components can be used and that particular operations described as being implemented in hardware can be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific implementations, it will be appreciated that the disclosure is intended to cover all modifications and equivalents within the scope of the following claims.

The machine learning model may be periodically and/or continuously trained. For instance, as the recommendations (or other predictions and derived information) are presented to the end-user, the system may monitor the end-user's behavior (e.g., whether a recommendation was accepted/rejected or whether a predicted attribute was revised). The monitored data may be fed back into the machine learning model to improve its accuracy. The machine learning model can re-calibrate itself accordingly, such that the results are customized for the end-user.

It should be understood that the disclosed implementations are not representative of all claimed innovations. As such, certain aspects of the disclosure have not been discussed herein. That alternate implementations may not have been presented for a specific portion of the innovations or that further undescribed alternate implementations may be available for a portion is not to be considered a disclaimer of those alternate implementations. Thus, it is to be understood that other implementations can be utilized and functional, logical, operational, organizational, structural and/or topological modifications may be made without departing from the scope of the disclosure. As such, all examples and/or implementations are deemed to be non-limiting throughout this disclosure.

Some implementations described herein relate to methods. It should be understood that such methods can be computer implemented methods (e.g., instructions stored in memory and executed on processors). Where methods described above indicate certain events occurring in a certain order, the ordering of certain events can be modified. Additionally, certain of the events can be performed repeatedly, concurrently in a parallel process, when possible, as well as performed sequentially as described above. Furthermore, certain implementations can omit one or more described events.

All definitions, as defined and used herein, should be understood to control over dictionary definitions, definitions in documents incorporated by reference, and/or ordinary meanings of the defined terms.

In the implementations, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system, comprising:
one or more processors, coupled with memory, to:
receive, via a first image capture device, one or more first images of a vehicle including a license plate of the vehicle while the vehicle is at a first region of a service facility that includes a car wash system, wherein the first region is an area of the service facility that includes a gate for controlling access to the car wash system;
identify, from the one or more first images, license plate information of the vehicle;

apply one or more machine learning based object detection models on the one or more first images of the vehicle to identify one or more (i) physical objects installed on a roof of the vehicle or (ii) racks attached to the vehicle;

identify a type of car wash service to be performed on the vehicle;

generate a car wash service request based on the license plate information of the vehicle, the one or more physical objects installed on the roof or the racks attached to the vehicle that are identified using the one or more first images received via the first image captured device, and the type of car wash service to be performed on the vehicle;

receive, via a second image capture device, one or more second images of the license plate of the vehicle while the vehicle is at a second region of the service facility, wherein the second region is an area between the first region and a tunnel corresponding to the car wash system;

identify, from the one or more second images, an identity of the vehicle entering into the car wash system;

generate a car wash routine using the car wash service request; and transmit, to a car wash controller, one or more instructions to cause the car wash system to execute the car wash routine by selectively controlling deployment of one or more car wash actuation components based on the one or more physical objects or racks identified from the one or more first images received via the first image capture device.

2. The system of claim 1, comprising the one or more processors to:
determine that the one or more physical objects are installed on a roof of the vehicle;
identify, responsive to the determination, an actuation component of the one or more car wash actuation components configured to clean the roof of the vehicle; and
selectively control deployment of the actuation component based on the one or more physical objects on the roof of the vehicle.

3. The system of claim 1, comprising the one or more processors to:
identify a data structure of a vehicle profile comprising an entry for the one or more physical objects; and
store, into the data structure of the vehicle profile, information on the one or more physical objects.

4. The system of claim 1, wherein the one or more second images are captured at the second region of the service facility at a second time interval subsequent to a first time interval during which the one or more first images were captured at the first region of the service facility.

5. The system of claim 1, wherein the one or more second images include the license plate of the vehicle and the one or more processors are configured to determine the identity of the vehicle based on extracted license plate information from the one or more second images.

6. The system of claim 1, wherein the one or more physical objects include at least one of: a roof rack, a bicycle rack, a cargo basket, or a spoiler component.

7. The system of claim 1, wherein the one or more car wash actuation components include a component to control application of one or more fluids onto the vehicle during the car wash routine.

8. The system of claim 1, wherein the one or more car wash actuation components include a component to control application of physical contact of a material onto a surface of the vehicle during the car wash routine.

9. The system of claim 1, wherein the car wash routine includes deploying a first actuation component of the one or more car wash actuation components during a first portion of the car wash routine and restricting deployment of a second actuation component of the one or more car wash actuation components during a second portion of the car wash routine.

10. The system of claim 1, wherein the car wash controller is communicatively coupled with the first image capture device, the second image capture device, a database storing the type of car wash service and the car wash system.

11. The system of claim 1, comprising the one or more processors to:
identify one or more vehicle features corresponding to a paint of the vehicle; and
selectively control deployment of a car wash actuation component for providing a car wash soap solution based on the paint.

12. The system of claim 1, comprising the one or more processors to:
identify at least one of a make or a model of the vehicle; and
provide, to the car wash controller, an instruction to selectively control deployment of a car wash actuation component of the one or more car wash actuation components, based on at least one of the make or the model.

13. The system of claim 1, comprising the one or more processors to:
identify, based on the one or more first images or the one or more second images, a difference between a body of the vehicle and a representation of the body of the vehicle stored in a vehicle profile of the vehicle;
determine that the difference satisfies a threshold for a significant difference; and
generate a notification to display on a device to indicate that the body of the vehicle differs from the stored representation of the body of the vehicle profile.

14. The system of claim 13, wherein the notification includes an alert to indicate that the vehicle had sustained damage since a prior update to the vehicle profile.

15. The system of claim 13, comprising the one or more processors to update the representation of the body of the vehicle in the vehicle profile responsive to the difference satisfying the threshold.

16. A method, comprising:
receiving, by one or more processors, via a first image capture device, one or more first images of a vehicle including a license plate of the vehicle while the vehicle is at a first region of a service facility that includes a car wash system, wherein the first region is an area of the service facility that includes a gate for controlling access to the car wash system;
identifying, by the one or more processors, from the one or more first images, license plate information of the vehicle;
applying, by the one or more processors, one or more machine learning based object detection models on the one or more first images of the vehicle to identify one or more (i) physical objects installed on a roof of the vehicle or (ii) racks attached to the vehicle;
identifying, by the one or more processors, a type of car wash service to be performed on the vehicle;
generating, by the one or more processors, a car wash service request based on the license plate information of the vehicle, the one or more (i) physical objects installed on the roof or (ii) racks attached to the vehicle that are identified using the one or more first images received via the first image captured device, and the type of car wash service to be performed on the vehicle;

receiving, by the one or more processors, via a second image capture device, one or more second images of the license plate of the vehicle while the vehicle is at a second region of the service facility, wherein the second region is an area between the first region and a tunnel corresponding to the car wash system;

identifying, by the one or more processors, from the one or more second images, an identity of the vehicle entering into the car wash system;

generating, by the one or more processors, a car wash routine using the car wash service request; and transmitting, by the one or more processors, to a car wash controller, one or more instructions to cause the car wash system to execute the car wash routine by selectively controlling deployment of one or more car wash actuation components based on the one or more physical objects or racks identified from the one or more first images received via the first image capture device.

17. The method of claim 16, further comprising:

determining, by the one or more processors, that the one or more physical objects are installed on a roof of the vehicle;

identifying, by the one or more processors, responsive to the determination, an actuation component of the one or more car wash actuation components configured to clean the roof of the vehicle; and selectively controlling deployment, by the one or more processors of the actuation component based on the one or more physical objects on the roof of the vehicle.

18. The method of claim 16, wherein the one or more physical objects include at least one of: a roof rack, a bicycle rack, a cargo basket, or a spoiler component.

19. A non-transitory computer-readable medium comprising instructions that, when executed by one or more processors, cause the one or more processors to:

receive, via a first image capture device, one or more first images of a vehicle including a license plate of the vehicle while the vehicle is at a first region of a service facility that includes a car wash system, wherein the first region is an area of the service facility that includes a gate for controlling access to the car wash system;

identify, from the one or more first images, license plate information of the vehicle;

apply one or more machine learning based object detection models on the one or more first images to identify one or more (i) physical objects installed on a roof of the vehicle or (ii) racks attached to the vehicle;

identify a type of car wash service to be performed on the vehicle;

generate a car wash service request based on the license plate information of the vehicle, the one or more physical objects installed on the roof or the racks attached to the vehicle that are identified using the one or more first images received via the first image captured device, and the type of car wash service to be performed on the vehicle;

receive, via a second image capture device, one or more second images of the license plate of the vehicle while the vehicle is at a second region of the service facility, wherein the second region is an area between the first region and a tunnel corresponding to the car wash system;

identify, from the one or more second images, an identity of the vehicle entering into the car wash system;

generate a car wash routine using the car wash service request; and transmit, to a car wash controller, one or more instructions to cause the car wash system to execute the car wash routine by selectively controlling deployment of one or more car wash actuation components based on the one or more physical objects or racks identified from the one or more first images received via the first image capture device.

20. The non-transitory computer-readable medium of claim 19 comprising the instructions that, when executed by the one or more processors, cause the one or more processors to:

identify, based on the one or more first images or the one or more second images, a difference between a body of the vehicle and a representation of the body of the vehicle stored in a vehicle profile of the vehicle;

determine that the difference satisfies a threshold for a significant difference; and generate a notification to display on a device to indicate that the body of the vehicle differs from the stored representation of the body of the vehicle profile.

* * * * *